(12) United States Patent
Nakamura et al.

(10) Patent No.: US 11,848,505 B2
(45) Date of Patent: Dec. 19, 2023

(54) LOOP ANTENNA, LOOP ANTENNA UNIT AND ELECTRONIC DEVICE

(71) Applicant: TOPPAN PRINTING CO., LTD., Tokyo (JP)

(72) Inventors: Tsukasa Nakamura, Taito-ku (JP); Nozomi Onaka, Taito-ku (JP); Kenzo Fukuyoshi, Taito-ku (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 240 days.

(21) Appl. No.: 17/019,855

(22) Filed: Sep. 14, 2020

(65) Prior Publication Data

US 2020/0411990 A1 Dec. 31, 2020

Related U.S. Application Data

(63) Continuation of application No. PCT/JP2018/009833, filed on Mar. 14, 2018.

(51) Int. Cl.
*H01Q 21/00* (2006.01)
*H01Q 21/06* (2006.01)
(Continued)

(52) U.S. Cl.
CPC ........... *H01Q 7/00* (2013.01); *H01Q 21/0006* (2013.01); *H01Q 21/06* (2013.01); *H02J 50/23* (2016.02); *H02J 50/27* (2016.02)

(58) Field of Classification Search
CPC ...... H01Q 7/00; H01Q 21/0006; H01Q 21/06; H01Q 1/2283; H01Q 1/24; H02J 50/23;
(Continued)

(56) References Cited

U.S. PATENT DOCUMENTS 7,973,722 B1 7/2011 Hill et al.
10,838,563 B2 * 11/2020 Kadota .................... H01Q 1/24
(Continued)

FOREIGN PATENT DOCUMENTS

CN 104969413 A 10/2015
CN 206727226 U 12/2017
(Continued)

OTHER PUBLICATIONS

Combined Taiwanese Office Action and Search Report dated Jan. 14, 2022 in corresponding Taiwanese Patent Application No. 107108383 (with English Translation and English Translation of Category of Cited Documents), 8 pages.
(Continued)

*Primary Examiner* — Hai V Tran
*Assistant Examiner* — Michael M Bouizza
(74) *Attorney, Agent, or Firm* — Oblon, McClelland, Maier & Neustadt, L.L.P.

(57) ABSTRACT

A loop antenna unit including two loop antennas having a same number of turns and different winding directions, the two loop antennas being positioned in line symmetry and not superposed on each other in a plan view. Each of the two loop antennas includes a loop conductive line wound continuously in one direction with n turns, where n is an integer of 3 or more, forming loops from a start point to an end point on the outermost loop or the innermost loop, the loop conductive line being bent in a transitional region in a direction from an outer loop toward an inner loop such that the loops have bent portions positioned side by side from an outermost first loop to an (n−1)th loop in the transitional region, and a jumper wire positioned on the insulating layer to cross the transitional region in a plan view.

8 Claims, 24 Drawing Sheets

(51) Int. Cl.
*H01Q 7/00* (2006.01)
*H02J 50/23* (2016.01)
*H02J 50/27* (2016.01)

(58) Field of Classification Search
CPC .......... H02J 50/27; H02J 50/12; H02J 50/402; H02J 50/70; H02J 50/502; G06K 19/077
See application file for complete search history.

(56) References Cited

U.S. PATENT DOCUMENTS

| | | |
|---|---|---|
| 11,251,527 B2 * | 2/2022 | Noh ........................ H01Q 1/243 |
| 2010/0019857 A1 | 1/2010 | McMorrow et al. |
| 2012/0043386 A1 | 2/2012 | Gotou |
| 2016/0013661 A1 * | 1/2016 | Kurs ........................ H02J 50/80 |
| | | 307/104 |
| 2017/0012339 A1 * | 1/2017 | Ito ............................ H01Q 1/36 |
| 2018/0098422 A1 | 4/2018 | Kuchiyama et al. |
| 2018/0294546 A1 * | 10/2018 | Yashiro .................... H01Q 1/24 |

FOREIGN PATENT DOCUMENTS

| | | |
|---|---|---|
| JP | 11-288448 A | 10/1999 |
| JP | 3171994 U | 11/2011 |
| JP | 2012-049714 A | 3/2012 |
| JP | 2015-075782 A | 4/2015 |
| JP | 5747182 B2 | 7/2015 |
| JP | 3211580 U | 7/2017 |
| TW | M454042 U1 | 5/2013 |
| TW | I585690 B | 6/2017 |
| WO | WO2010/125818 A1 | 10/2012 |
| WO | WO2016/163323 A1 | 10/2016 |

OTHER PUBLICATIONS

International Search Report dated Jun. 5, 2018 in PCT/JP2018/009833, filed Mar. 14, 2018, (with English Translation).
Japanese Office Action dated Jul. 17, 2019 in Japanese Application 2018-543398, 6 pages (with English Machine Translation).
Combined Chinese Office Action and Search Report dated Oct. 8, 2022 in Chinese Patent Application No. 201880091196.6 (with English translation of office action only), 13 pages.

* cited by examiner

US 11,848,505 B2

LOOP ANTENNA, LOOP ANTENNA UNIT AND ELECTRONIC DEVICE

CROSS-REFERENCE TO RELATED APPLICATIONS

The present application is a continuation of International Application No. PCT/JP2018/009833, filed Mar. 14, 2018, the entire contents of which are incorporated herein by reference.

BACKGROUND OF THE INVENTION

Field of the Invention

The present invention relates to a loop antenna, a loop antenna unit and an electronic device that can be used in electronic devices and portable devices such as smartphones having wireless power supply/reception functions.

Discussion of the Background

In recent years, planar loop antennas, also referred to as planar coil antennas, are often used in wireless communications and wireless power supply/reception. Techniques of applying a wireless charging coil to a mobile phone are disclosed in PTLs 1 and 2. A technique of providing a touch panel and a planar antenna together is disclosed in PTL 3.

A technique of disposing a planar antenna on an exterior surface of a housing of a display device or the like is disclosed in PTL 4. FIGS. 5 and 6 of PTL 4 each show an antenna arranged with line symmetry. The antenna shown in FIG. 5 of PTL 4 has a plurality of crossover lines (for example, crossover line 122). Therefore, the antenna is provided with a plurality of points (for example, points 122 and 102) which serve as through holes, and thus arouses concerns about occurrence of defective electrical connection.

PTL 1: JP 5747182 B
PLT 2: JP 3211580 U
PLT 3: JP 3171994 U
PLT 4: U.S. Pat. No. 7,973,722 B

SUMMARY OF THE INVENTION

According to an aspect of the present invention, a loop antenna unit including two loop antennas having a same number of turns and different winding directions, the two loop antennas being positioned in line symmetry and not superposed on each other in a plan view. Each of the two loop antennas includes a loop conductive line wound continuously in one direction with n turns, where n is an integer of 3 or more, forming loops from a start point on an outermost loop or an innermost loop to an end point on the outermost loop or the innermost loop, the loop conductive line being bent in a transitional region in a direction from an outer loop toward an inner loop such that the loops have bent portions positioned side by side from an outermost first loop to an (n−1)th loop in the transitional region, an insulating layer which overlaps with the loop conductive line and the transitional region, and has a first through hole at a position corresponding to an end portion of the first loop and a second through hole at a position corresponding to an end portion of the n-th loop, and a jumper wire positioned on the insulating layer to cross the transitional region in a plan view, the jumper wire being formed between the first through hole and the second through hole to electrically connect the first loop and the n-th loop.

BRIEF DESCRIPTION OF THE DRAWINGS

FIG. 13 is a block diagram of an electronic device according to an eighth embodiment of the present invention including a loop antenna and the like.

FIG. 18 is a cross-sectional view of the electronic device according to the eighth embodiment of the present invention including a loop antenna and the like.

DESCRIPTION OF THE EMBODIMENTS

Figure 1:
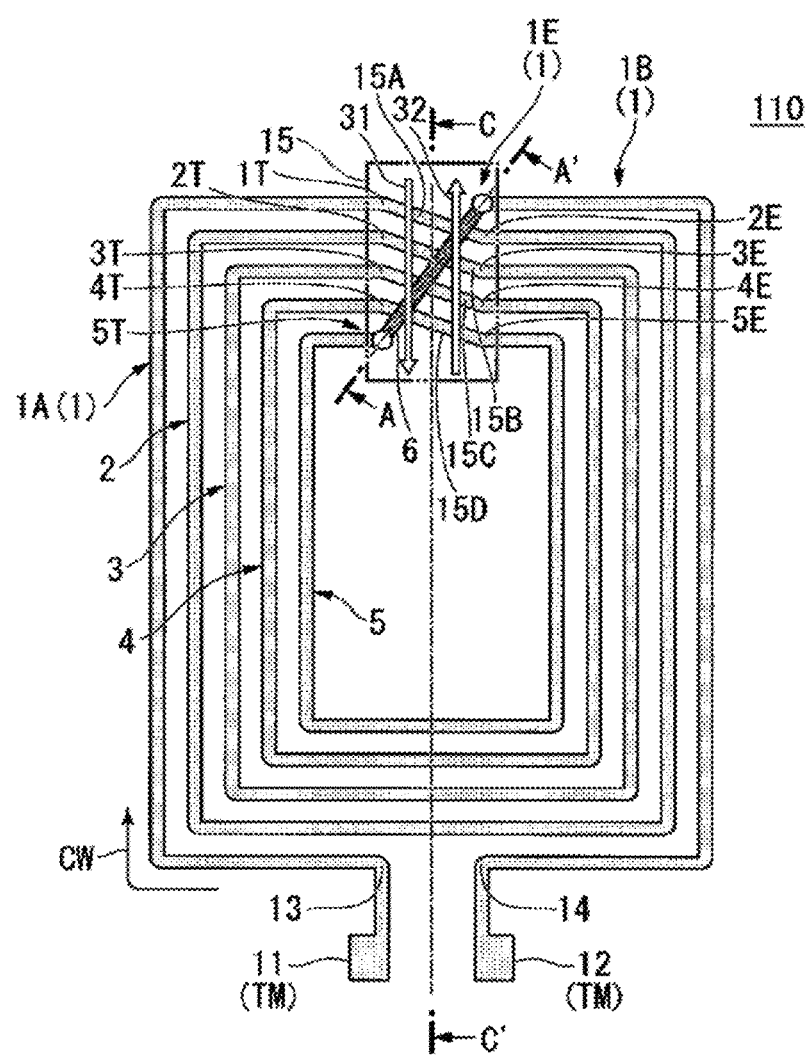
FIG. 1 is a plan view of a loop antenna according to a first embodiment of the present invention.

The embodiments will now be described with reference to the accompanying drawings, wherein like reference numerals designate corresponding or identical elements throughout the various drawings.

With reference to the drawings, embodiments of the present invention will be described.

In the following description, identical or substantially identical functions and components are indicated by identical reference signs to omit or simplify description, or description will be given only when necessary. Throughout the drawings, in order to illustrate the components at a recognizable size, the dimensions and proportions of the components are modified as appropriate. In the drawings, components difficult to illustrate, for example, a configuration of a plurality of layers constituting a channel layer of a semiconductor, a configuration of a plurality of layers constituting a conductive layer, and the like are entirely or partially omitted as necessary. For clear explanation of the embodiments of the present invention, electric circuit elements, a display function layer, etc. are sometimes shown in a simplified manner.

In the following description, "plan view" means "plan view as viewed in an observation direction in which a loop antenna, a loop antenna unit or an electronic device is observed by the observer". Alternatively, a view when viewed in an observer direction (direction in which an observer P views the electronic device) may be simply referred to as a plan view.

First Embodiment

Figure 2:
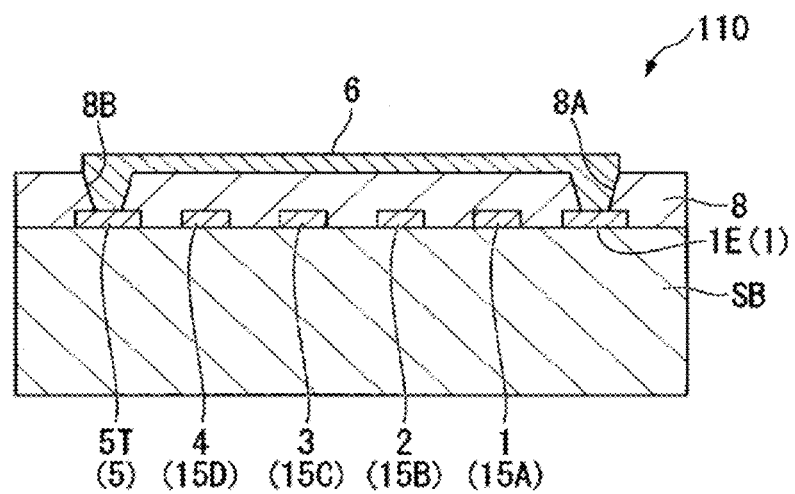
FIG. 2 is a cross-sectional view, taken along line A-A', of the loop antenna according to the first embodiment of the present invention.

FIG. 1 is a plan view illustrating the shape of a loop antenna 110 according to a first embodiment. FIG. 2 is a cross-sectional view, taken along line A-A' (jumper wire 6), of the loop antenna 110 according to the first embodiment.
(Loop Antenna)

As shown in FIG. 1, the loop antenna 110 is composed of a conductive line (loop conductive lines 1 to 5) which is wound continuously in one direction with n turns, where n is an integer and 3 or more. The conductive line includes a plurality of loops (loop conductive lines), and has a start point 13 and an end point 14 which are provided in an outermost circumferential loop or an innermost circumferential loop, among the plurality of loops. The "plurality of loops" are not separate loop members, but constitute one conductive pattern formed by collective patterning using a known film formation process or a photolithography technique.

Further, the loop antenna 110 has a transitional region 15 (which will be described later) to which the loops 1 to 5 are joined; an insulating layer 8 provided so as to overlap with the loops 1 to 5 and the transitional region 15; and a jumper wire 6 provided on the insulating layer 8 so as to cross the transitional region 15 in plan view. As shown in FIG. 2, the loop antenna 110 is formed on a substrate SB. Further, the material for the substrate SB is not particularly limited. As will be described later, the material for the substrate is appropriately selected according to the structure of an electronic device in which the loop antenna is used.

The loop antenna 110 according to the present embodiment can be used, for example, in vehicle-mounted loop antennas and wireless power supply/reception systems.

In the present embodiment, the integer n is 5, and the loop antenna 110 includes five loops. The loop antenna 110 has the first loop 1; the second loop 2 ((n−3)th loop, i.e., "5-3" th loop); the third loop 3 ((n−2)th loop, i.e., "5-2" th loop); the fourth loop 4 ((n−1)th loop, i.e., "5-1" th loop) and the fifth loop 5.
(First Loop)

The first loop 1 is the outermost circumferential loop positioned outermost among the plurality of loops constituting the loop antenna 110 (outermost circumferential loop among the loop conductive lines 1 to 5). The first loop 1 is a loop from which the winding starts in the loop antenna 110 in which the plurality of loops are arranged from the outside toward the inside. The first loop 1 has the start point 13 joined to a first terminal 11 (terminal unit TM), and the plurality of loops constituting the loop antenna 110 are wound so as to form a loop shape from the start point 13 in a clockwise direction CW in plan view.

The first loop 1 has an end portion 1E (first portion) and a portion 1T (second portion facing the end portion 1E).

The first loop 1 has a first divided loop 1A and a second divided loop 1B which are bent and extend along an outer shape of the loop antenna 110. The first divided loop 1A includes the start point 13 and a first transition portion 15A joined to a portion 2E of the second loop 2. The second divided loop 1B includes the end portion 1E and the end point 14 joined to a second terminal 12 (terminal unit TM). The start point 13, end point 14, first terminal 11 and second terminal 12 are positioned outside the loop antenna 110.

In the present embodiment, the first loop 1 has the start point 13 and the end point 14 which are located to be spaced apart from each other and to face each other. In the line structure of the first loop 1 in plan view, the start point 13 and the end point 14 are not joined to each other. In embodiments of the present invention, even when having such a start point and such an end point, the loop is referred to as a "loop".
(Second to Fourth Loops)

The second loop 2 is bent and extends along the first loop 1 in plan view, and is positioned inside the first loop 1. The second loop 2 has a portion 2E (first portion) and a portion 2T (second portion facing the portion 2E).

The third loop 3 is bent and extends along the second loop 2 in plan view, and is positioned inside the second loop 2. The third loop 3 has a portion 3E (first portion) and a portion 3T (second portion facing the portion 3E).

The fourth loop 4 is bent and extends along the third loop 3 in plan view, and is positioned inside the third loop 3. The fourth loop 4 has a portion 4E (first portion) and a portion 4T (second portion facing the portion 4E).

The second loop 2, the third loop 3 and the fourth loop 4 are intermediate loops positioned between the first and fifth loops 1 and 5, and the number of the intermediate loops is 3.

(Fifth Loop)

The fifth loop 5 is the innermost circumferential loop positioned on the innermost side among the plurality of loops constituting the loop antenna 110 (innermost circumferential loop among the loop conductive lines 1 to 5). The fifth loop 5 has a portion 5E (first portion) and an end portion 5T (second portion facing the portion 5E).

The fifth loop 5 is bent and extends along the fourth loop 4 in plan view, and is positioned inside the fourth loop 4.

With regard to the shapes of the above-described loops 1 to 5, the phrase "bent and extends" means a linear shape having at least bent portion or curve. Also, this phrase means a shape in which a straight line is combined with bent portion or curve. In the example shown in FIG. 1, each of the loops 1 to 5 has straight lines, but may adopt a loop shape having no straight lines.

(Transitional Region)

The loop antenna 110 has the transitional region 15 where the plurality of loops are joined. The transitional region 15 has the first transition portion 15A, a second transition portion 15B, a third transition portion 15C and a fourth transition portion 15D. In other words, the number of transition portions in the loop antenna 110 is n−1, i.e., 4 in the present embodiment.

In the transitional region 15, the mutually adjacent two loops, among the plurality of loops 1 to 5, are joined via any of the transition portions 15A to 15D.

The transition portions 15A to 15D are bent parts which are inclined relative to crossing direction 31 or 32, which will be described later.

In other words, in the transitional region 15, the loop conductive lines 1 to 5 are bent so as to transition from the loop positioned relatively outside to the loop positioned relatively inside in association with turns of the loop conductive lines 1 to 5. Portions where the plurality of loops are sequentially bent are arranged from the outermost first loop to the (n−1)th loop. Also the plurality of loops are sequentially bent in the direction 31 or 32, which will be described later.

The transitional region 15 will be specifically described below.

In the structure of the transitional region 15, the phrase "bent obliquely outward" means that the transition portions are bent so as to shift in a direction from the inside of the loop antenna 110 (position of the innermost circumferential loop) toward the outside thereof (position of the outermost circumferential loop). The phrase "bent obliquely inward" means that the transition portions are bent so as to shift in a direction from the outside of the loop antenna 110 toward the inside thereof.

When focusing on the first and second loops 1 and 2, the first transition portion 15A (outer transition portion) is joined to the first loop 1 positioned adjacent on the outside of the portion 2E while being bent obliquely outward from the portion 2E (first portion) of the second loop 2. In other words, the first transition portion 15A (inner transition portion) is joined to the second loop 2 positioned adjacent on the inside of the portion 1T while being bent obliquely inward from the portion 1T (second portion) of the first loop 1.

When focusing on the second and third loops 2 and 3, the second transition portion 15B (outer transition portion) is joined to the second loop 2 positioned adjacent on the outside of the portion 3E while being bent obliquely outward from the portion 3E (first portion) of the third loop 3. In other words, the second transition portion 15B (inner transition portion) is joined to the third loop 3 positioned adjacent on the inside of the portion 2T while being bent obliquely inward from the portion 2T (second portion) of the second loop 2.

When focusing on the third and fourth loops 3 and 4, the third transition portion 15C (outer transition portion) is joined to the third loop 3 positioned adjacent on the outside of the portion 4E while being bent obliquely outward from the portion 4E (first portion) of the fourth loop 4. In other words, the third transition portion 15C (inner transition portion) is joined to the fourth loop 4 positioned adjacent on the inside of the portion 3T while being bent obliquely inward from the portion 3T (second portion) of the third loop 3.

When focusing on the fourth and fifth loops 4 and 5, the fourth transition portion 15D (outer transition portion) is joined to the fourth loop 4 positioned adjacent on the outside of the portion 5E while being bent obliquely outward from the portion 5E (first portion) of the fifth loop 5. In other words, the fourth transition portion 15D (inner transition portion) is joined to the fifth loop 5 positioned adjacent on the inside of the portion 4T while being bent obliquely inward from the portion 4T (second portion) of the fourth loop 4.

The structure of the transitional region 15 described above will be described in more detail.

The first loop 1 is bent inward in the loop shape of the loop antenna 110 at a position facing the terminal unit TM (first and second terminals 11 and 12) (portion 1T in the transitional region 15) in plan view, and is joined to the second loop 2.

The second loop 2 is bent inward in the loop shape of the loop antenna 110 at a position facing the terminal unit TM (portion 2T in the transitional region 15), and is joined to the third loop 3.

The third loop 3 is bent inward in the loop shape of the loop antenna 110 at a position facing the terminal unit TM (portion 3T in the transitional region 15), and is joined to the fourth loop 4 in the transitional region 15.

The fourth loop 4 is bent inward in the loop shape of the loop antenna 110 at a position facing the terminal unit TM (portion 4T in the transitional region 15), and is joined to the fifth loop 5 in the transitional region 15.

With regard to the shape of the loop antenna 110 shown in FIG. 1, the phrase "bent inward" means that the loops 1 to 4 are each bent obliquely with respect to the direction 31 or 32 crossing the outer shapes of the loops 1 to 4 (loop diameter) in the transitional region 15.

The loop diameter is a size of the loop outer shape across the central axis of the loop antenna, and the direction across the loop diameter may be a direction along the short axis of the loop antenna or a direction along the long axis thereof. Thus, the "direction across the loop diameter" has the same meaning as the central axis of the loop antenna.

The direction crossing the outer shapes of the loops 1 to 4 may be either the crossing direction 31 extending inward in the loop antenna 110 or the crossing direction 32 extending outward in the loop antenna 110.

The loop corresponding to the end of the loop antenna 110 is the fifth loop 5 (n=5). The start point 13 extends in a direction away from the loop antenna 110, and is joined to the first terminal 11. The end point 14 extends in a direction away from the loop antenna 110, and is joined to the second terminal 12.

The end portion 5T of the fifth loop 5 is electrically connected to the end portion 1E of the first loop 1 (outermost circumferential loop) via the jumper wire 6 and through holes formed in the insulating layer 8. The end portion 1E is joined to the end point 14 via the second divided loop 1B of the first loop 1, and the end point 14 is joined to the second terminal 12.

In the transitional region 15 shown in FIG. 1, each of the transition portions 15A to 15D electrically connects two mutually adjacent loops, among the plurality of loops 1 to 5. The jumper wire 6 electrically connects the first and fifth loops 1 and 5.

When the number of turns exceeds 5, the number of transition portions which are bent obliquely with respect to the crossing direction 31 or 32 increases.

Except the first and second terminals 11 and 12, the loop antenna 110 may be electrically connected to circuits including a capacitor (an antenna unit, a charging control unit, an NFC communication unit, etc. which will be described later).

The number of turns shown in FIG. 1 is not limited to 5 in embodiments of the present invention, and any number may be employed so long as the number of turns is 3 or more. Generally, when the number of turns exceeds 25, the resistance value of the conductive line constituting the loop antenna increases, so that the antenna efficiency easily decreases. When the antenna is used as a power receiving antenna for wireless power supply/reception, the number of turns can be set to 3 or more and 25 or less in order to ensure the output voltage of the power receiving antenna.

On the other hand, when the number of turns is 2 or less, it is difficult to ensure sufficient output voltage. In addition, when the number of turns is small, e.g., 2 or less, the magnetic field distribution due to the loop antenna is likely to be biased. In this case, the coupling in power supply/reception and signal transmission/reception (communications) lowers in mutually facing antennas, so that resonance is likely to become unstable.

Generally, when the number of turns is 26 or more, the line length of the conductive line constituting the loop antenna becomes too long, so that the antenna efficiency is likely to decrease due to the increase in resistance value.

Note that the outer shape of the loop antenna in plan view may be a circle, an ellipse, a rectangle, a polygon or the like.
(Insulating Layer)

The insulating layer 8 is provided so as to overlap with the loop conductive lines and the transitional region 15. The insulating layer 8 has a first through hole 8A provided at a position corresponding to the end portion 1E of the first loop 1 and a second through hole provided at a position corresponding to the end portion 5T of the fifth loop 5.

The insulating layer 8 may be made of a material such as an inorganic material such as SiO2 or SiN, a resin material such as an acrylic or a polyimide, or a resin material used for a printed substrate. The dielectric constant of the insulating layer 8 is desirably low.
(Jumper Wire)

The jumper wire 6 is provided on the insulating layer 8 so as to cross the transitional region 15 in plan view, and formed between the first and second through holes 8A and 8B. The jumper wire 6 is electrically connected to the end portion 1E of the first loop 1 in the first through hole 8A, and electrically connected to the end portion 5T of the fifth loop 5 in the second through hole 8B. Thus, the jumper wire 6 electrically connects the end portion 1E of the loop 1 and the end portion 5T of the fifth loop 5.

In the loop antenna 110, the number of jumper wires 6 is 1, and the number of through holes (first and second through holes 8A and 8B) is small, i.e., 2. Therefore, the burden in the production of the loop antenna 110 can be greatly reduced.

As shown in FIG. 1, the jumper wire 6 extends obliquely opposite to the transition portions 15A to 15D about the crossing direction 31 or 32. Specifically, the transition portions 15A to 15D are bent inward in the loop antenna 110 (in the crossing direction 31) in a direction from the left side (first side) toward the right side (second side). On the other hand, the jumper wire 6 extends outward in the loop antenna 110 (in the crossing direction 32) in the direction from the left side (first side) toward the right side (second side).

The loops 1 to 5 and jumper wire 6 constituting the loop antenna 110 are formed of conductive lines. For example, the loops 1 to 5 and transition portions 15A to 15D are composed of conductive lines formed on the substrate SB, and the jumper wire 6 is composed of a conductive line formed on the insulating layer 8. Such conductive lines each have a three-layer configuration in which a copper layer or a copper alloy layer is sandwiched between conductive metal oxides.

Examples of the three-layer configuration include a conductive metal oxide layer/a copper alloy layer/a conductive metal oxide layer. The present invention is not limited to such a configuration, and the loop antenna may also be formed using a configuration in which a copper foil is laminated via an adhesive material. In place of the copper alloy layer, a pure copper layer may also be adopted. The copper alloy layer which may be present may have a configuration in which it is laminated on a layer made of a transition metal such as nickel or titanium or an alloy layer containing the material. In the electrical connection structure between the loops 1 and 5 and the jumper wire 6 in the first and second through holes 8A and 8B which will be described later, a layer made of a noble metal such as gold or a conductive oxide including indium oxide is desirably formed on surfaces of the end portions 1E and 5T. Surfaces of the first and second terminals 11 and 12 which will be described later may be subjected to plating with a noble metal such as gold, or solder plating.

By using a layer made of a noble metal such as gold or a conductive oxide including indium oxide, electrical mounting can be performed with low contact resistance.

Figure 23:
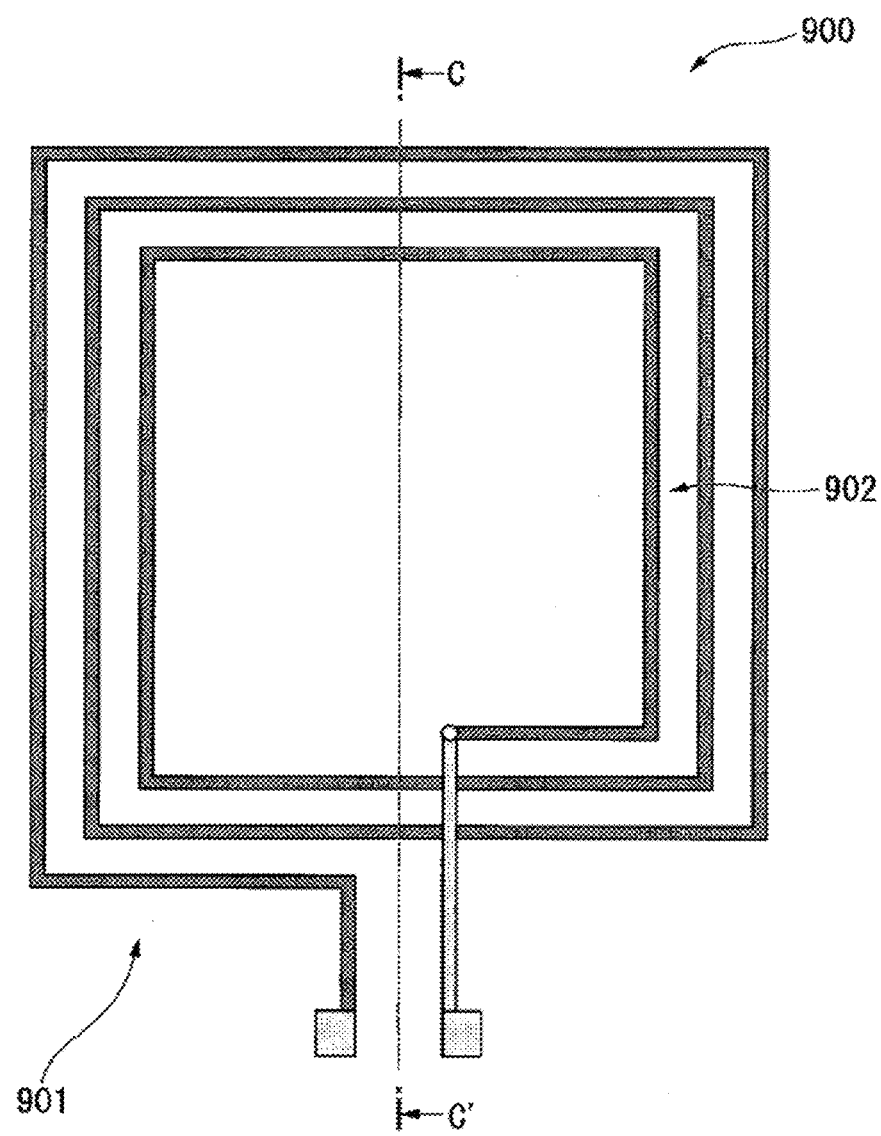
FIG. 23 is a plan view of a conventional loop antenna.

FIG. 23 is a plan view of a conventional loop antenna 900.

The shapes of an outermost circumferential loop 901 and an innermost circumferential loop 902 constituting the loop antenna 900 are asymmetrical about a center line C-C'. Therefore, the loop antenna 900 is inferior in symmetry of the antenna.

On the other hand, the loop antenna according to the first embodiment shown in FIG. 1 has not attained strict symmetry in the transitional region 15, but the loops 1 to 5 are arranged in symmetry about the center line C-C' except in the transitional region 15. Thus, the loop antenna has attained greatly improved symmetry as compared with the loop antenna 900 of the conventional example. In a loop antenna having high symmetry, magnetic field is more uniformly generated, and, along with this, noise radiated from the loop antenna is easily suppressed. A loop antenna having excellent uniformity of the magnetic field easily resonates even in a high frequency band. A loop antenna inferior in uniformity of the magnetic field is likely to cause an increase in radiated noise, and is likely to impose noise on peripheral electronic circuits and devices.
(Modification 1 of First Embodiment)

Figure 3:
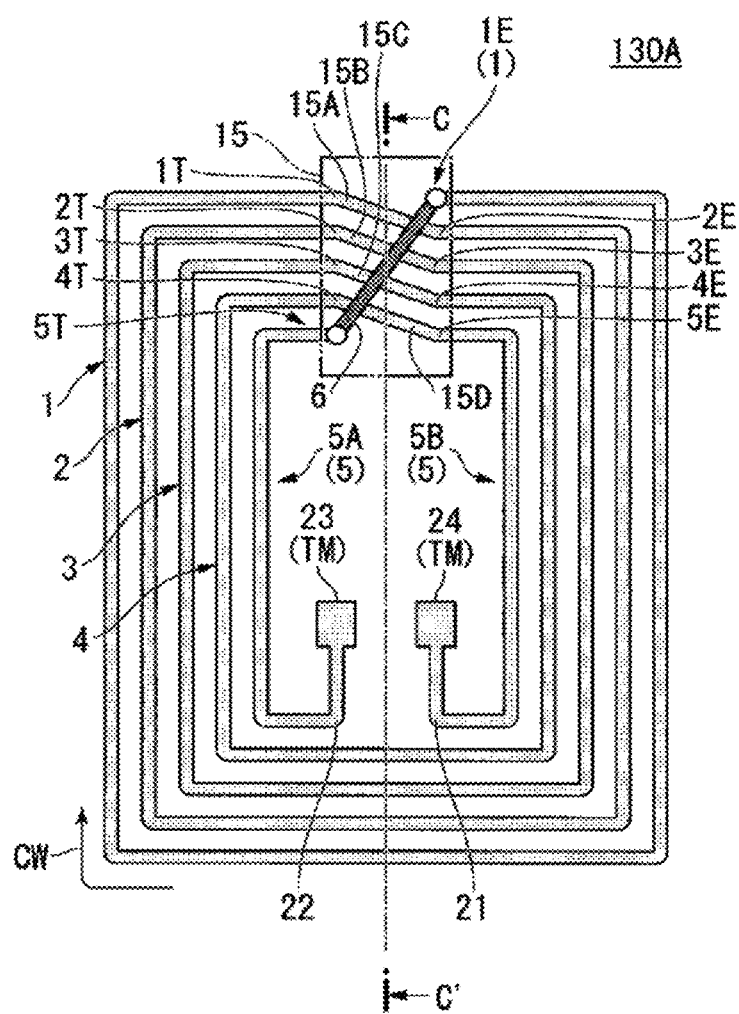
FIG. 3 is a plan view of a loop antenna according to Modification 1 of the first embodiment of the present invention.

FIG. 3 is a plan view of a loop antenna 130A according to a modification of the first embodiment. In FIG. 3, components identical with those of the first embodiment are given the same reference signs to omit or simplify description.

This modification is different from the first embodiment described above in that the start point and the end point are arranged on the inside of the loop antenna.

(First to Fourth Loops)

The first loop 1 is wound so as to form a loop shape from the end portion 1E in the clockwise direction CW in plan view. The first loop 1 does not have the start point 13 or the end point 14 described above. The second to fourth loops are similar to those of the first embodiment described above.

(Fifth Loop)

The fifth loop 5 is a loop from which the winding starts in the loop antenna 130 in which the plurality of loops are arranged from the inside toward the outside. The fifth loop 5 has a start point 22 joined to a first terminal 23 (terminal unit TM), and the plurality of loops constituting the loop antenna 130A are wound so as to form a loop shape from the start point 22 in the clockwise direction CW in plan view.

The fifth loop 5 has an end portion 5E (first portion) and a portion 5T (second portion facing the end portion 5E).

The fifth loop 5 has a first divided loop 5A and a second divided loop 5B which are bent and extend along the fourth loop 4. The first divided loop 5A is joined to the start point 22 and the jumper wire 6. The second divided loop 5B is joined to the end portion 5E and the end point 21 joined to a second terminal 24 (terminal unit TM). The start point 22, end point 21, first terminal 23 and second terminal 24 are positioned on the inside of the loop antenna 130A.

In the present modification, the fifth loop 5 has the start point 22 and the end point 21 which are located to be spaced apart from each other and to face each other, and the start point 22 and the end point 21 are not joined to each other in terms of the line structure in plan view. As in the embodiment described above, even when having such a start point and such an end point, the loop is referred to as a "loop".

The loop antenna 130A according to the present modification provides effects similar to those of the embodiment described above.

The loop antenna 130A having such a structure is applied, for example, to a sixth embodiment which will be described later. It should be noted that, in the present modification, the first and second terminals 23 and 24 may not be formed. The loop antenna 130A can be applied to data carriers, IC cards and the like.

(Modification 2 of First Embodiment)

Figure 4:
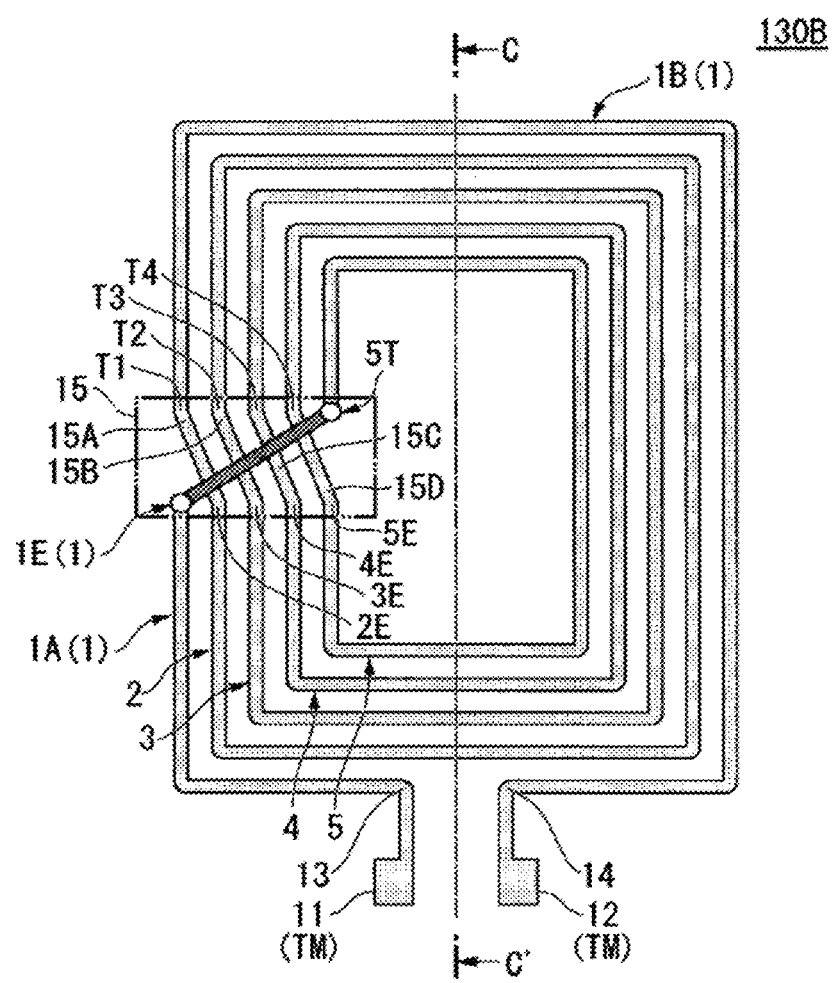
FIG. 4 is a plan view of a loop antenna according to Modification 2 of the first embodiment of the present invention.

FIG. 4 is a plan view of a loop antenna 130B according to a modification of the first embodiment. In FIG. 4, components identical with those of the first embodiment are given the same reference signs to omit or simplify description. The present modification is different from the first embodiment described above in terms of the position where the transitional region 15 is formed.

Specifically, in the example shown in FIG. 1, the transitional region 15 is provided on a side opposite to the position where the terminal unit TM is arranged in the loop antenna 110, but, in Modification 2, the terminal unit 15 is provided on the left side of the loop antenna 130B. Even such a configuration provides effects similar to those of the first embodiment described above.

Second Embodiment

Figure 5:
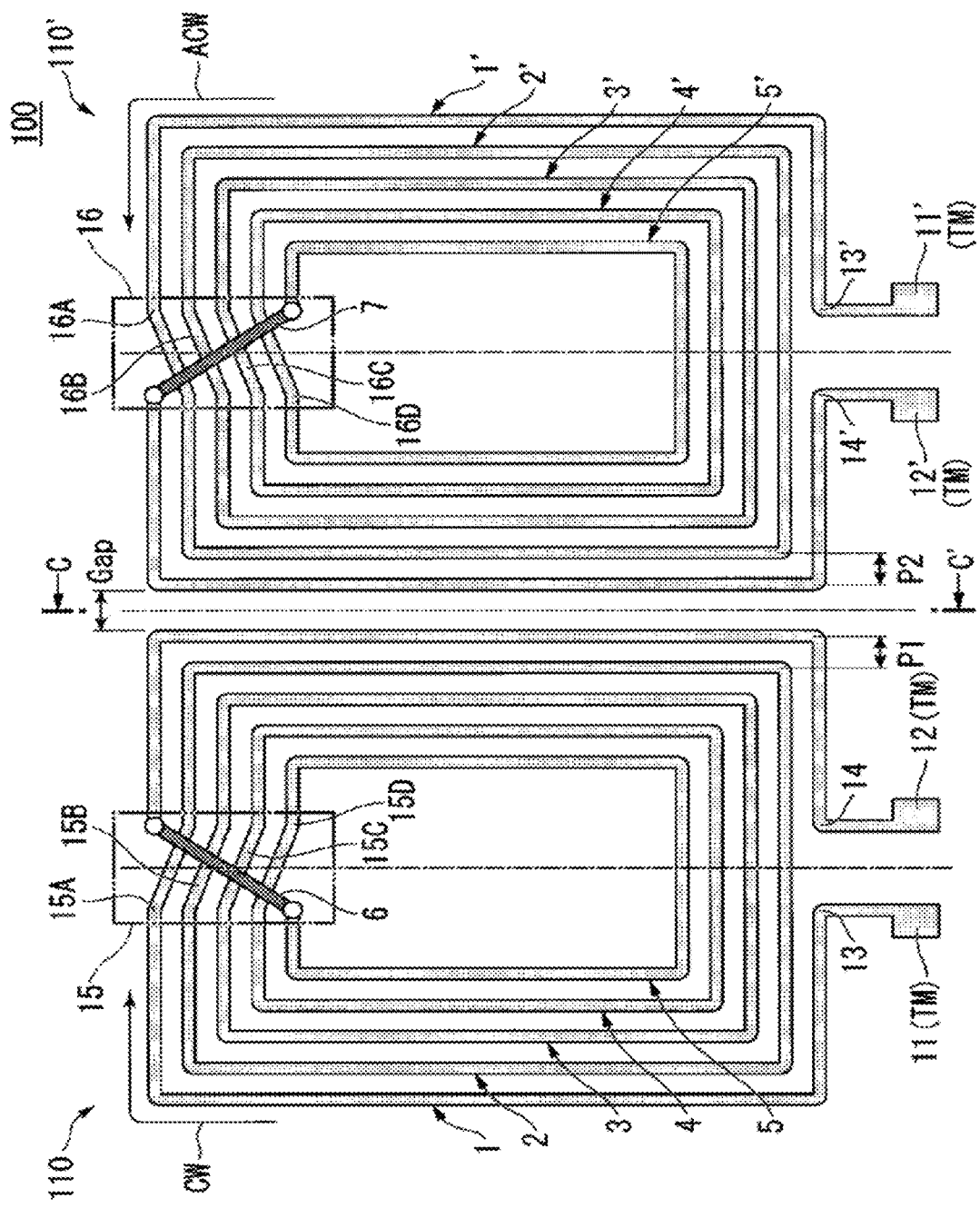
FIG. 5 is a plan view of a loop antenna unit according to a second embodiment of the present invention.

FIG. 5 is a plan view of a loop antenna unit according to a second embodiment. In FIG. 5, components identical with those of the first embodiment are given the same reference signs to omit or simplify description.

(Loop Antenna Unit)

A loop antenna unit 100 according to the present embodiment is composed of two loop antennas 110 and 110' (first and second loop antennas) each having the structure of the loop antenna according to the first embodiment described above.

The two loop antennas 110 and 110' have the same number of turns as each other and are different from each other in winding direction. In plan view, the two loop antennas 110 and 110' are arranged with line symmetry in which the loop antennas are not superposed on each other.

Specifically, the loop antenna 110 has the loops 1 to 5 wound from the start point 13 in the clockwise direction CW (first direction). The loop antenna 110' has the loops 1' to 5' wound from a start point 13' in a counterclockwise direction ACW (second direction). The loops 1' to 5' are different from the loops 1 to 5 in terms of the winding direction, but identical therewith in terms of the other structures, materials and the like.

The loop antenna 110 includes the transitional region 15 having the transition portions 15A to 15D and the jumper wire 6. The loop antenna 110' includes a transitional region 16 having transition portions 16A to 16D and a jumper wire 7. The transition portions 16A to 16D and the jumper wire 7 are arranged with line symmetry to the transition portions 15A to 15D and the jumper wire 6, respectively, about the center line C-C'. The transition portions 16A to 16D and the jumper wire 7 are different from the transition portions 15A to 15D and the jumper wire 6 in this regard, but identical therewith in terms of the other structures, materials and the like.

The second embodiment has illustrated the example in which the loop antenna unit 100 is composed of one set of the two loop antennas 110 and 110'. However, the number of loop antennas constituting one loop antenna unit is not limited to 2. One loop antenna unit may be composed of three or more loop antennas. In this case, the winding directions of the two loop antennas are the inverse of each other.

The loop antenna unit 100 according to the present embodiment has a structure in which the two loop antennas indicated in the first embodiment described above are arranged so as to attain a line symmetrical shape about the center line C-C'. The transitional regions 15A to 15D and the transitional regions 16A to 16D in the transitional regions 15 and 16, respectively, have rather complex shapes, and are likely to cause noise generation. However, the transition portions 15A to 15D constituting the transitional region 15 and the transition portions 16A to 16D constituting the transitional region 16 are formed with line symmetry, thereby making it possible to cancel the noise generated from the transitional regions 15 and 16 and to suppress noise generation in the antennas.

By adjusting a pitch P1 of the respective loops constituting the loop antenna 110, a pitch P2 of the respective loops constituting the loop antenna 110', and the width of a gap Gap between the loop antennas 110 and 110', the coupling between the loop antennas can be adjusted. The loop antennas 110 and 110' are arranged so as to be adjacent to each other, so that the magnetic field intensity at a position close to the center line C-C' can be improved.

When the loop antenna unit 100 according to the second embodiment is used as an antenna for wireless power supply/reception, the loop antenna unit 100 can be used as a power supplying antenna, or can also be used as a power receiving antenna. In a power supply stand called a cradle, a plurality of loop antenna units 100 may be disposed, for example, in a matrix.

It should be noted that each of the loop antennas 110 and 110' constituting the loop antenna unit 100 includes a capacitive element (capacitor) and is connected in parallel to a power source which drives the loop antennas 110 and 110'.

Third Embodiment

Figure 6:
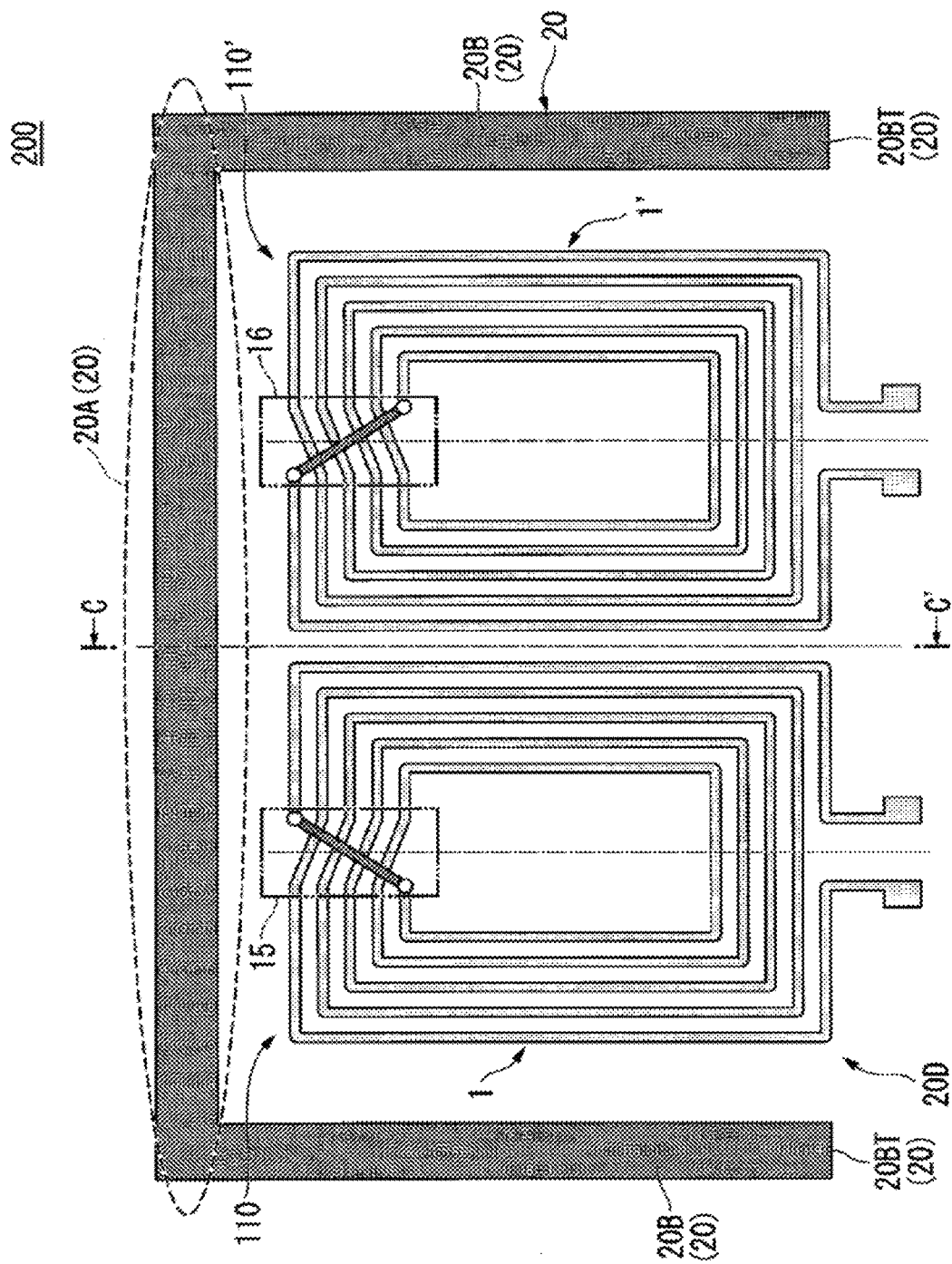
FIG. 6 is a plan view of a loop antenna unit according to a third embodiment of the present invention.

FIG. 6 is a plan view of a loop antenna unit according to a third embodiment. In FIG. 6, components identical with those of the second embodiment are given the same reference signs to omit or simplify description.
(Loop Antenna Unit)

A loop antenna unit 200 according to the third embodiment includes not only the loop antenna unit 100 indicated in the second embodiment, but also a conductive pattern 20 which partially surrounds the peripheries of the loop antennas 110 and 110' (conductive pattern which surrounds part of the peripheries of the loop antennas 110 and 110').

The conductive pattern 20 has a substantially U-shape, and the loop antennas 110 and 110' are arranged inside the substantially U-shape.

Specifically, the conductive pattern 20 has a back portion 20A which faces both of the loop antennas 110 and 110' and two side portions 20B which are positioned on respective sides of the back portion 20A. Of the two side portions 20B, one side portion 20B (first side portion) faces the first loop 1 (outermost circumferential loop) of the loop antenna 110, and the other side portion 20B (second side portion) faces the first loop antenna 1' (outermost circumferential loop) of the loop antenna 110'. The two side portions 20B extend in a direction orthogonal to the direction in which the back portion 20A extends, and are joined to the back portion 20A. In the two side portions 20B, end portions 20BT are formed at ends opposite to the parts joined to the back portion 20A, and an opening 20D is formed between the end portions 20BT of the two side portions 20B. Due to the opening 20D, the conductive pattern 20 does not surround the entire peripheries of the loop antennas 110 and 110'.

The loop antenna unit 200 having such a configuration is effective when a high-current electronic component is arranged near the loop antenna unit 200.

The back portion 20A of the conductive pattern 20 is directed in the direction of the high-current electronic component, i.e., the back portion 20A is arranged between the electronic component and the loop antennas 110 and 110', so that the influence of noise on the loop antennas 110 and 110' can be reduced. A loop antenna unit in which a part of the periphery of the loop antenna unit is surrounded by the conductive pattern 20 will be described later.

Figure 24:
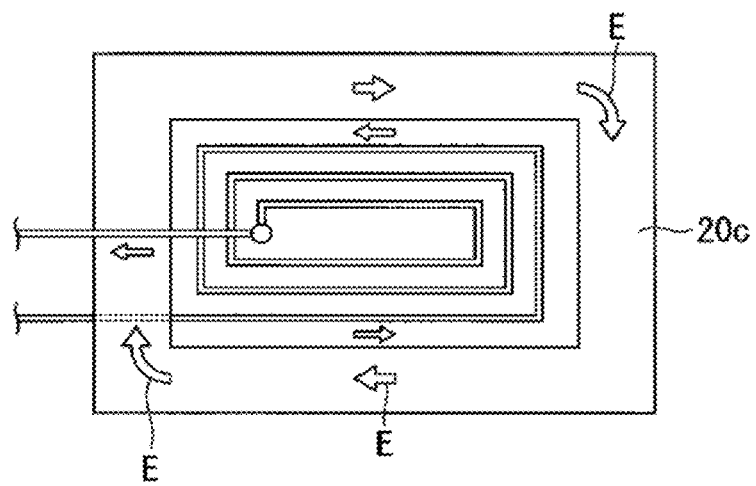
FIG. 24 is an explanatory view illustrating how an eddy current occurs on an occasion when a loop antenna is surrounded by a conductive pattern.

It should be noted that the conductive pattern 20 must be a pattern with an opened part (not an electrically closed pattern, but an electrically open pattern), as shown in FIG. 6. An electrically connected conductive pattern 20c as shown in FIG. 24 is influenced, for example, by the current of the (external) electronic component arranged around the conductive pattern 20c and the magnetic field, so that eddy current E is easily caused. This eddy current E serves as a noise source which generates a reverse current in the antenna positioned inside the conductive pattern 20c.

Fourth Embodiment

Figure 7:
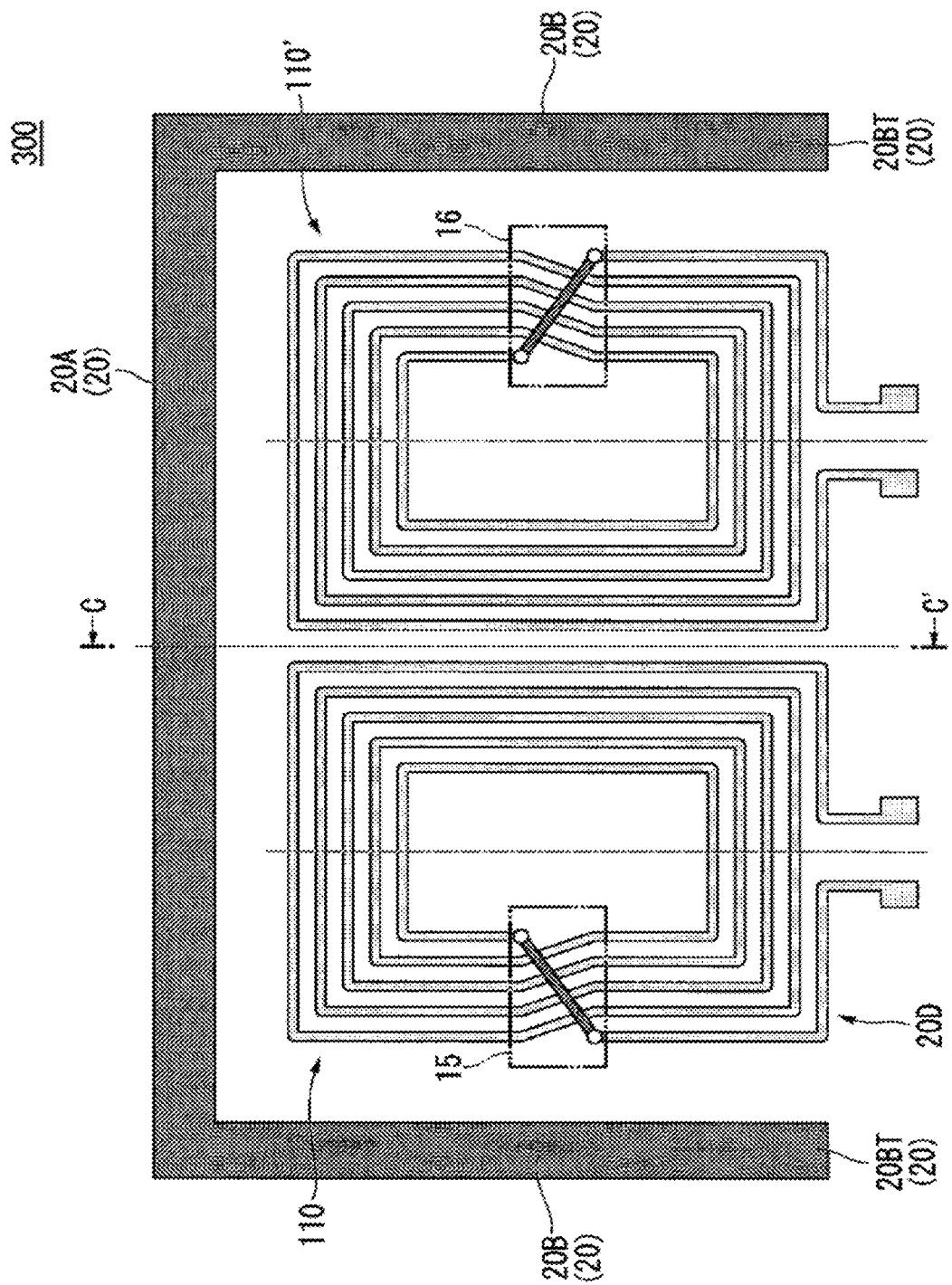
FIG. 7 is a plan view of a loop antenna unit according to a fourth embodiment of the present invention.

FIG. 7 is a plan view of a loop antenna unit according to a fourth embodiment. In FIG. 7, components identical with those of the third embodiment are given the same reference signs to omit or simplify description.
(Loop Antenna Unit)

A loop antenna unit 300 indicated in the fourth embodiment includes the conductive pattern 20 which partially surrounds the peripheries of the loop antennas 110 and 110' as in the third embodiment. The fourth embodiment is different from the third embodiment in terms of the arrangement of the transitional regions 15 and 16.

Specifically, in the loop antenna unit 200 according to the third embodiment, the transitional regions 15 and 16 are arranged at positions facing the back portion 20A. In contrast, in the loop antenna unit 300 according to the fourth embodiment, the transitional regions 15 and 16 are arranged at positions facing the two side portions 20B.

The other structures of the loop antenna unit 300 are identical with those of the loop antenna unit 200. In the present embodiment, the effects obtained by the loop antenna unit 300 are substantially equivalent to those of the loop antenna unit 200 according to the third embodiment.

Fifth Embodiment

Figure 8:
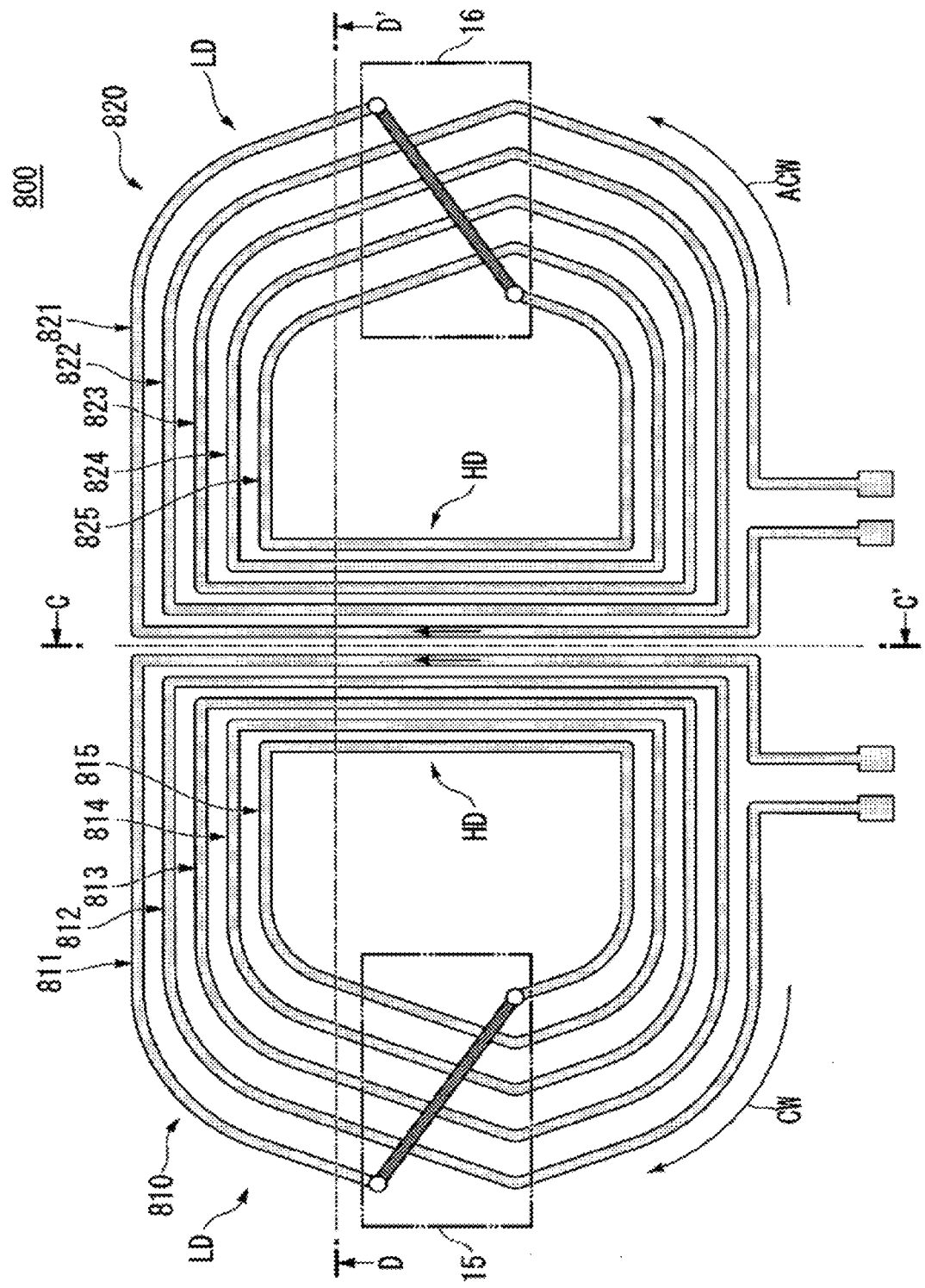
FIG. 8 is a plan view of a loop antenna unit according to a fifth embodiment of the present invention.

FIG. 8 is a plan view of a loop antenna unit according to a fifth embodiment. In FIG. 8, components identical to those of the embodiment described above are given the same reference signs to omit or simplify description.
(Loop Antenna Unit)

A loop antenna unit 800 according to the fifth embodiment has two loop antennas 810 (first loop antenna) and 820 (second loop antenna).

The two loop antennas 810 and 820 have the same number of turns as each other and are different from each other in winding direction. In plan view, the two loop antennas 810 and 820 are arranged with line symmetry in which the loop antennas are not superposed on each other.

The fifth embodiment is different from the second embodiment in terms of the density of the loops constituting the loop antenna.

Specifically, the loop antenna 810 has a plurality of loops 811 to 815 continuously wound in the clockwise direction CW. The loop antenna 820 has a plurality of loops 821 to 825 continuously wound in the counterclockwise direction ACW.

In each of the loop antennas 810 and 820, the line density of the loops is higher in an internal region HD located at a position closer to the center line C-C', and is lower in an external region LD further from the center line C-C'.

The line density means the total length of the plurality of loops per unit area. Alternatively, the line density may mean the number of the loops per unit width in a direction crossing the plurality of loops (direction perpendicular to the center line C-C') in plan view.

Therefore, the line density is high in the region (internal region HD) where the total length of the plurality of loops per unit area is large. Alternatively, the line density is low in the region (external region LD) where the number of the loops per unit width in the direction crossing the plurality of loops is small.

In the external region LD with a low line density, a low-density magnetic flux is formed. Therefore, along with this, the radiation of noise to the periphery of the loop antenna unit 800 can be suppressed. The formation of the external region LD with a low line density can suppress the generation of parasitic capacitance in the loop antennas 810 and 820. In addition, the mutually adjacent loop antennas 810 and 820 are arranged symmetrically about the center line C-C', and thus the effect of canceling noise radiation due to the symmetry of the antennas is obtained, so that the radiation of noise to the outside of the loop antenna unit 800 can be suppressed.

Also, the magnetic field coupling between the loop antennas 810 and 820 in the region (internal region HD) near the center line C-C' is improved. Therefore, when the loop antenna unit 800 is used as a power supplying antenna or power receiving antenna which performs wireless power supply/reception, the efficiency of power supply/reception of the loop antenna unit 800 to/from a cradle (charging stand) can be improved. The external region LD where the line density of the plurality of loops is low and the internal region HD where the line density of the plurality of loops is high are provided, so that the effect of facilitating the expansion of the frequency band is obtained. It is possible to obtain a margin which allows positional deviation between the cradle and the loop antenna unit 800, so that the power supply/reception efficiency can be improved. The loop antenna unit 800 has the external region LD with a low line density, thereby making it possible to reduce the parasitic capacitance in each of the loop antennas 810 and 820 and improve the power supply/reception efficiency.

As shown in FIG. 8, the mutually adjacent loop antennas 810 and 820 are arranged symmetrically about the center line C-C' as an axis in plan view. When the loop antenna unit 800 is viewed from outside, the uniformity of the magnetic field radiation is kept, and the balance is easily ensured. In addition, the two loop antennas 810 and 820 are adjacent to each other, so that the magnetic field coupling which is symmetrical about the center line C-C' is easily attained.

Further, in the direction perpendicular to the center line C-C', the line density of the plurality of loops constituting a loop antenna having a small diameter is changed, so that the magnetic field distribution can be easily centered on the center of the loop antenna unit 800. Alternatively, parts which are different in line density of the plurality of loops (internal region HD and external region LD) are provided, thereby making it possible to expand the resonant frequency band. Also, the magnetic field distribution can be centered on the proximity of the center line C-C', thereby making it possible to smoothly perform charging using the cradle (charging stand) including a plurality of antennas, for example. In other words, the resonance to the plurality of antennas included in the cradle is improved, and a margin for positioning between the cradle and the plurality of antennas (margin which allows positional deviation) is expanded.

In the loop antenna unit 800 according to the present embodiment, the conductive pattern 20 which partially surrounds the two loop antennas 810 and 820 and has a substantially U-shape may be provided.

Sixth to Eighth Embodiments

The electronic devices according to the sixth to eighth embodiments include communication devices such as smartphones, tablets and notebook PCs; wearable terminals such as smart watches and smart glasses; cameras; game devices; electronic papers; data carriers such as IC cards and memory cards having a display unit; and information media having a communication function such as personal identification devices. The electronic devices according to the sixth to eighth embodiments include electronic devices having a display function of a display unit of a TV or an advertisement medium, and having an electrostatic capacitive type input function. Such an electronic device preferably has a wireless charging function, from the viewpoint of easiness to carry and handle.

The sixth to eighth embodiments below describe only characteristic parts of the electronic devices according to the embodiments which will be described later, and may omit description of parts that are not different from components used, for example, in generally used electronic devices.

Ordinal numerals such as "first" and "second", as in the first substrate, second substrate, first line, second line, and third line, or first conductive metal oxide layer and second conductive metal oxide layer are given to avoid confusion of components, and do not limit quantity thereof. Also, the first conductive metal oxide layer and the second conductive metal oxide layer may also be hereinafter simply referred to as conductive metal oxide layer.

The electronic devices which will be described later each include a first antenna unit, a second antenna unit, a third antenna unit, a fourth antenna unit and a fifth antenna unit corresponding to the loop antenna units according to the second to fifth embodiments described above. In the embodiments which will be described later, the first to fifth antenna units are sometimes referred to simply as antenna units, and the loop antennas are sometimes referred to simply as antennas. The antenna unit according to the embodiments of the present invention has the same meaning as the loop antenna unit.

When the electronic devices according to the sixth to eighth embodiments each have a display unit, a plurality of light emitting diode elements called LEDs (Light Emitting Diodes), a plurality of organic EL (organic electroluminescence) elements also called OLEDs, or a liquid crystal layer can be used as a display function layer constituting the display unit.

Organic EL elements may be used in a display function layer using an organic material in which when an electric field is applied between a pair of electrodes, a hole injected from an anode (e.g., upper electrode) and an electron injected from a cathode (e.g., lower electrode, pixel electrode) are recombined with each other and thus cause excitation so that light is emitted from a pixel. The display function layer in the case of organic EL contains at least a luminescent material, and preferably an electron-transporting material. A light emitting layer is formed between an anode and a cathode. When a hole injection layer is formed above a lower electrode (positive electrode), the light emitting layer is formed between the hole injection layer and an upper electrode (negative electrode). When a hole-transporting layer is formed on the anode, the light emitting layer is formed between the hole transport layer and the cathode. Roles of the upper electrode and the lower electrode can be exchanged with each other.

LEDs have an electrode structure similar to that of the organic EL elements, and driving of the LEDs (display function layer or light emitting layer) is performed similarly to that of the organic EL elements. The LEDs each have a single layer configuration of a compound semiconductor or a laminated configuration of compound semiconductors, such as indium gallium nitride (InGaN), gallium nitride (GaN), aluminum gallium nitride (AlGaN), aluminum gallium arsenide (AlGaAs), gallium arsenide phosphide (GaAsP), and gallium phosphide (GaP).

As will be described later, the structure of the compound semiconductors is often a laminated configuration of n-type semiconductor layer/light emitting layer/p-type semiconductor layer. In the electrode structure of the LED, there is known a structure in which a positive electrode and a negative electrode are arranged on one surface of the laminated configuration, in other words, a horizontal light emitting diode in which these electrodes are arranged in the horizontal direction. Alternatively, a vertical light emitting diode is known in which an upper electrode/an n-type semiconductor layer/a light emitting layer/a p-type semiconductor layer/a lower electrode are laminated in a direction perpendicular to the thickness. In the vertical light emitting diode, the upper electrode and the lower electrode are disposed on different surfaces. As described above, the light emitting layer of the LED is made of an inorganic material.

The substrates applicable to the electronic devices according to the sixth to eighth embodiments are not limited to transparent substrates. Examples of the substrates applicable to the first substrate, second substrate and third substrate which will be described later include glass substrates, quartz (including artificial quartz) substrates, sapphire substrates, and ceramic substrates. The second substrate and the third substrate may be transparent, opaque, or colored. It is also possible to use substrates made of a resin such as polyimide, polyimide amide, polyethylene terephthalate, polyether sulfone, polyether ether ketone, potytetrafluoroethylene, polyamide, maleimide, polycarbonate, acrylic or epoxy resins. Further, substrates made of a resin having a small dielectric loss are desirably applied to electronic devices. A filler such as glass fibers may be added to the substrates made of such a resin. It is also possible to form the antenna pattern by a known photolithography method with an etchant, using a substrate made of an epoxy resin having a copper foil laminated thereon via an adhesive material. When the loop antenna according to any of the above-described embodiments is used in a card-shaped electronic device such as a wireless IC card, a substrate using vinyl chloride may be used as the resin substrate.

In a configuration in which the antenna unit including the loop antenna according to any of the above-described embodiments is applied to an electronic device, the antenna unit can be formed between multiple resin layers or between multiple ceramic layers. In an electronic device having such a configuration, various electric signals can be transmitted and received in a wireless manner, and power required for driving the electronic device can be transmitted and received. Alternatively, the substrate on which the antenna is formed may be a magnetic member in which ferrite or the like is dispersed.

When considering application of a light emitting element such as an LED or organic EL that requires heat dissipation to an electronic device, a thermal conductivity κ (W/m·K) of a substrate used in the electronic device is desirably greater than 1, in order to avoid heat buildup. A thermal conductivity of a generally used glass substrate is around 0.5 to 0.8 W/m·K, and tempered glass, quartz substrates, sapphire glass, and the like, having a thermal conductivity better than this thermal conductivity are preferred as the substrate used in the electronic devices according to the sixth to eighth embodiments.

As lines formed on the substrates used in the electronic devices according to the sixth to eighth embodiments, including first conductive lines, second conductive lines, source lines for driving thin film transistors, gate lines, power source lines and antennas, it is preferable to use lines including copper wiring or copper alloy wiring having good thermal conductivity. A metal layer having good thermal conductivity or a light absorbing layer having good thermal conductivity is preferably included in the configuration of a conductive shield layer, on a fourth surface of the second substrate forming the light emitting element (light emitting diode element) such as an LED or organic EL element.

Sixth Embodiment

Figure 9:
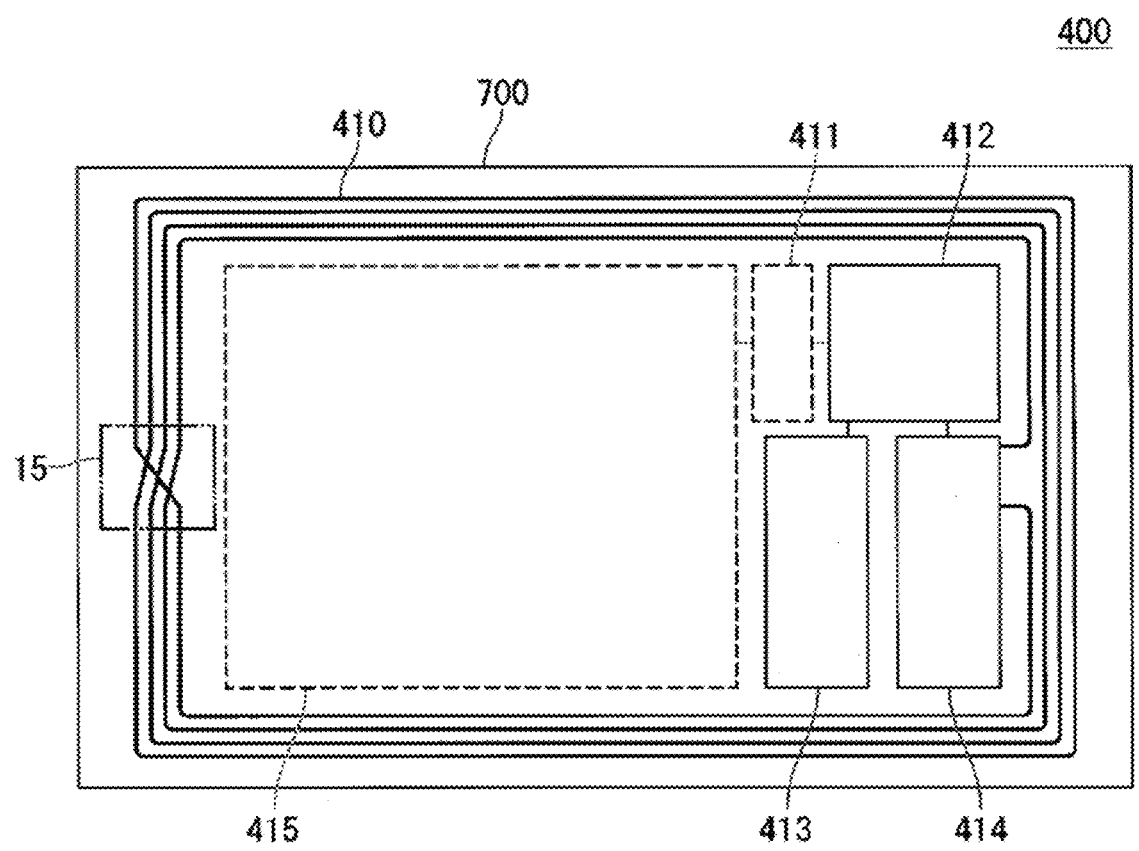
FIG. 9 is a plan view of an electronic device according to a sixth embodiment of the present invention, which shows a structure to which the loop antenna shown in FIG. 3 is applied.

FIG. 9 is a plan view of an electronic device according to a sixth embodiment, which shows a structure to which the loop antenna shown in FIG. 3 is applied. In the present embodiment, a data carrier called a wireless IC card is used as the electronic device. In FIG. 9, components identical to those of the embodiment described above are given the same reference signs to omit or simplify description.

For example, an electronic device 400 has a structure in which a loop antenna 410, an antenna power source unit 411, a control unit 412, a memory 413, a charging control unit 414, and a secondary battery 415 are formed on a substrate 700 composed of a resin film of a vinyl chloride resin or the like. The secondary battery 415 is, for example, a lithium battery or a large-capacity capacitor. The charging control unit 414 and the secondary battery 415 may be omitted from the electronic device 400, similarly to the structures of many conventionally known IC cards. The antenna power source unit 411 includes a tuning circuit, a rectifying circuit and the like, which control communications (resonance) with an IC card reader/writer, for example, at 13.56 MHz. The frequency used for communications is not limited to 13.56 MHz, and a plurality of frequency bands may be used. Frequencies higher than 13.56 MHz may be used.

The loop antenna 410 is composed of a conductive line having the number of turns in the range of 3 to 25 by patterning a copper foil having a thickness of several μm to several tens of μm formed on the substrate 700. For example, an IC chip in which the antenna power source unit 411, the control unit 412, the memory 413, and the like are integrated is mounted, for example, on the substrate 700. Further, after mounting, a lamination process is performed with a vinyl chloride resin or the like, and the end face of the substrate 700 is processed into a desired shape, so that the electronic device 400, which is an IC card, is obtained.

Seventh Embodiment

Figure 10:
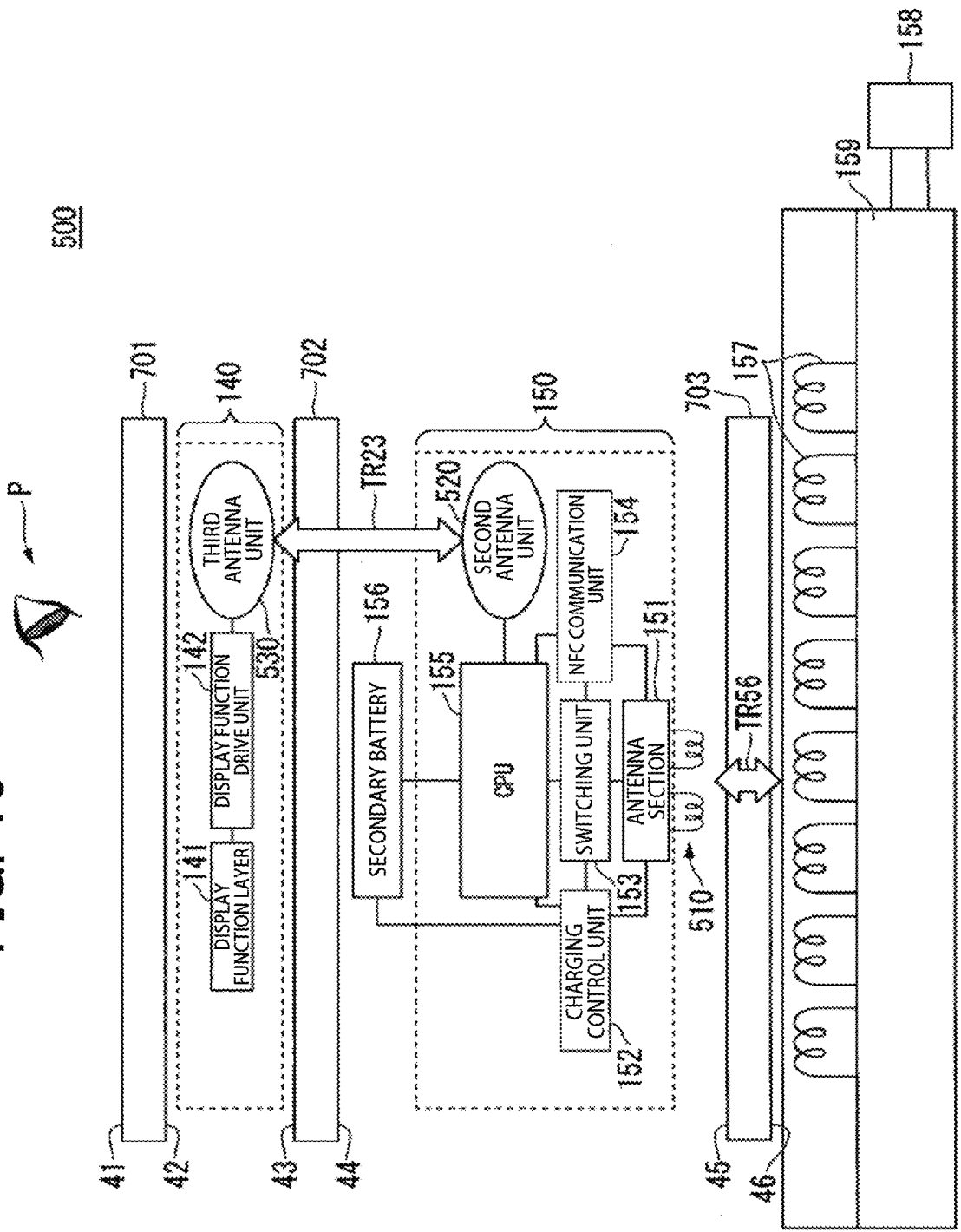
FIG. 10 is a block diagram of a configuration of an electronic device according to a seventh embodiment of the present invention.
Figure 11:
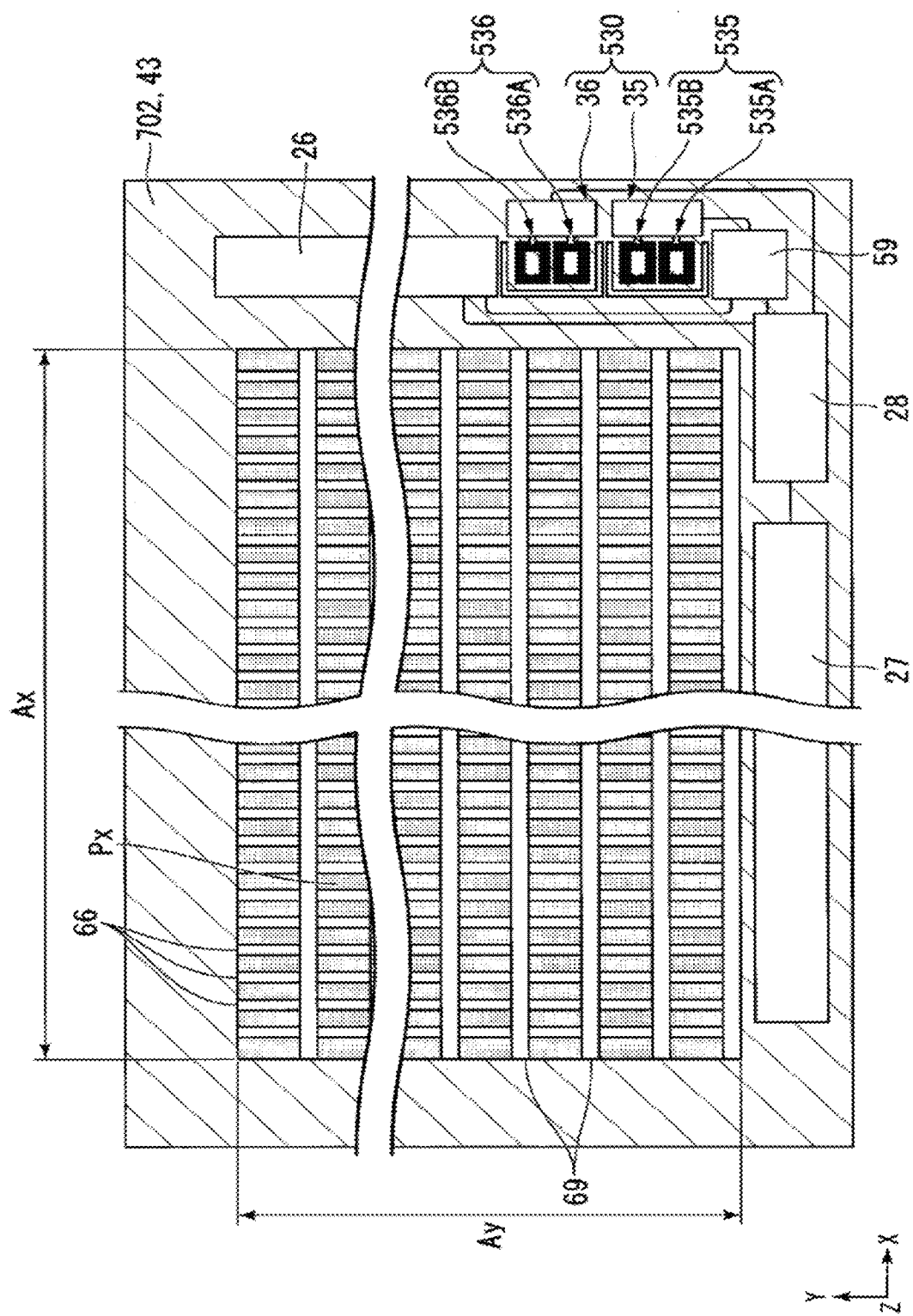
FIG. 11 is a plan view of a second substrate provided with a loop antenna unit constituting the electronic device according to the seventh embodiment of the present invention.
Figure 12:
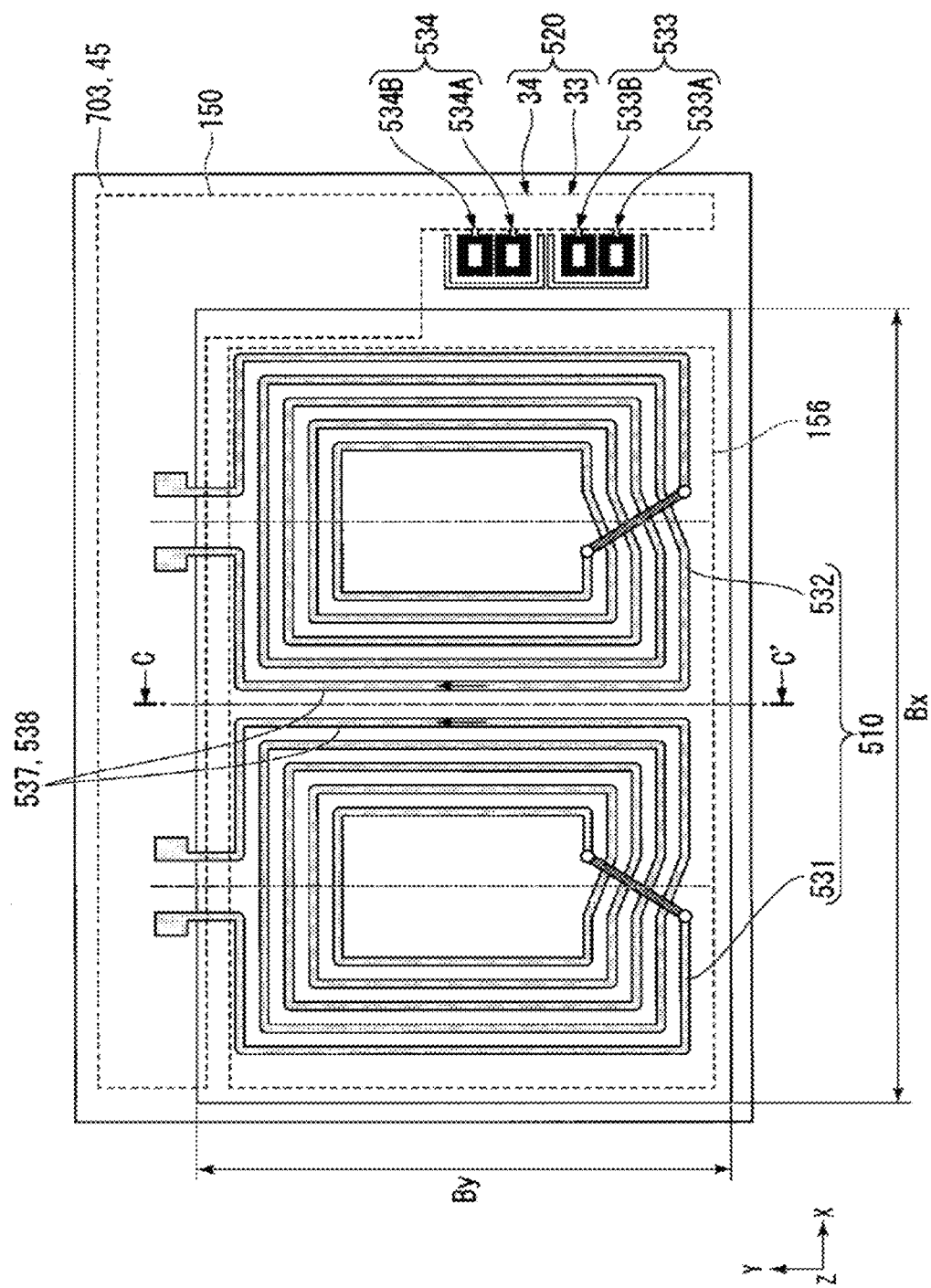
FIG. 12 is a plan view of a third substrate provided with the loop antenna unit constituting the electronic device according to the seventh embodiment of the present invention.

FIG. 10 is a block diagram of a configuration of an electronic device according to a seventh embodiment. FIG. 11 is a plan view of a second substrate provided with a loop antenna unit constituting the electronic device according to the seventh embodiment of the present invention. FIG. 12 is a plan view of a third substrate provided with the loop antenna unit constituting the electronic device according to the seventh embodiment of the present invention. In FIGS. 10 to 12, components identical to those of the embodiment described above are given the same reference signs to omit or simplify description.
(Functional Configuration of Electronic Device)

As shown in FIG. 10, an electronic device 500 includes a first substrate 701, a second substrate 702, and a third substrate 703. The first substrate 701, the second substrate 702, and the third substrate 703 are layered on each other in this order in plan view as viewed in the observation direction.

The first substrate 701 has a first surface 41 and a second surface 42. The second substrate 702 has a third surface 43 and a fourth surface 44. The third substrate 703 has a fifth surface 45 and a sixth surface 46.
(Display Unit)

A display unit 140 is provided between the second surface 42 of the first substrate 701 and the third surface 43 of the second substrate 702, and includes a display function layer 141, a display function drive unit 142, and a third antenna unit 530.

The display function layer 141 is, for example, a liquid crystal layer, and the display function drive unit 142 is an active element (TFT) array disposed in a matrix on the second substrate 702. As the liquid crystal constituting the liquid crystal layer, various liquid crystals such as twisted nematic, guest-host, and polymer dispersed liquid crystals can be applied.

A color filter having a plurality of coloring patterns of red, green, and blue may be formed on one of the first and second substrates 701 and 702. The color filter may include cyan, magenta, yellow, and white colors, or may be a complementary color filter of cyan, magenta, and yellow.

(System Control Unit)

The system control unit 150 is provided between the second substrate 702 and the third substrate 703, and includes an antenna section 151, a charging control unit 152, a switching unit 153, an NFC communication unit 154 (Near Field Communication), a CPU 155 (Central Processing Unit) and a second antenna unit 520.

In the present embodiment, the system control unit 150 is a control unit that controls a display function of the display unit 140, a communication function, and a wireless charging function. Further, as will be described later, the secondary battery 156 is provided at a position adjacent to the system control unit 150.

The system control unit 150 performs transmission/reception of various signals related to the drive of the display function layer between the display unit 140 and the system control unit 150, in a wireless manner, via the third antenna unit 530 and the second antenna unit 520, as shown by an arrow indicated by the symbol TR23, and performs supply and reception of power required for driving the display function layer in a wireless manner.

The CPU 155 is electrically connected to the secondary battery 156, the second antenna unit 520, the charging control unit 152, the switching unit 153, and the NFC communication unit 154. The charging control unit 152 and the NFC communication unit 154 are electrically connected to the switching unit 153. The antenna section 151 is electrically connected to the charging control unit 152, the switching unit 153, and the NFC communication unit 154.

The second antenna unit 520 performs transmission/reception of video signals and power transmission to/from an active element array constituting the display unit 140.

The antenna section 151 includes a first antenna unit 510 having the shape shown in the second embodiment, in which loop antennas are disposed with line symmetry.

The charging control unit 152 receives power supplied from an external power source of 100 V or the like (an AC adapter 158 or a cradle 159 in FIG. 10) via the first antenna unit 510 provided in the antenna section 151, as indicated by an arrow indicated by the symbol TR56. The charging control unit 152 includes a rectifying function and a voltage monitoring function of the secondary battery 156, and supplies power from the charging control unit 152 to the secondary battery 156 for charging.

The antenna section 151 includes the first antenna unit 510 composed of a pair of loop antennas having different winding directions, and has a function of adjusting the coil lengths of the capacitor and loop antennas used for resonance. The switching unit 153 receives a signal from the system control unit 150 and switches between the power receiving function and the near field communication (NFC communication) function of the antenna section 151.

In the power reception performed by the antenna section 151, a frequency based on the Qi standard can be adopted. For example, frequencies of 100 KHz to 200 KHz can be used. Alternatively, the power reception by the antenna section 151 can comply with an international standard of wireless charging that is planned in the future. As the resonance frequency of near field communications using the antenna section 151, for example, 13.56 MHz or a frequency higher than this frequency can be adopted. Near field communications are controlled by the NFC communication unit 154. The NFC communication unit 154 has modulation/demodulation functions for performing near field communications.

(External Power Source)

The cradle 159 shown in FIG. 10 has a function of charging the electronic device 500 according to the seventh embodiment, a mobile terminal such as a smartphone, and a wearable device, and functions as a power supplying unit. The cradle 159 includes a plurality of power supply-side antennas 157 of an electromagnetic induction type, and the electronic device 500 can receive the power supplied from the one or more power supply-side antennas 157 in a wireless manner. The cradle 159 has an antenna switching unit that selects any one of the plurality of power-supply side antennas 157. The cradle 159 is connected to an external power source of 100V or 220V via an AC adapter 158, for example.

(Secondary Battery)

Further, the secondary battery 156 is provided at a position adjacent to the system control unit 150 between the second substrate 702 and the third substrate 703.

Examples of the secondary battery 156 include a lithium battery, a nickel hydrogen battery, an organic radical battery, a lead battery, a lithium air battery, a nickel zinc battery, a nickel cadmium battery, and a silver zinc battery. For example, a laminated lithium battery may be used in which a metal layer of nylon, aluminum or the like, cycloparaphenylene (CPP), an electrode, a separator, an electrolytic solution and the like are laminated by an exterior material. It is preferable to apply a completely solid-state lithium battery, for example, a secondary battery such as a lithium sulfur battery, to the secondary battery 156. In addition, a large-capacity capacitor can be provided on the second surface of the first substrate and the third surface of the second substrate on which it is difficult to provide the secondary battery 156 from the viewpoint of space (thickness between the substrates). A thin film formed by a method such as vacuum film formation can be used for the configuration of a large-capacity capacitor.

A temperature sensor is installed in the secondary battery 156, and, when the charging control unit 152 detects a temperature abnormality, the charging control unit 152 stops power supply (power transmission/reception) to the secondary battery 156.

The substrates used as the first substrate 701, the second substrate 702, and the third substrate 703 shown in FIG. 10 do not need to be limited to transparent substrates. Examples of the substrates applicable to the first substrate 701, second substrate 702 and third substrate 703 include glass substrates, quartz (including artificial quartz) substrates, sapphire substrates, and ceramic substrates. The second substrate 702 and the third substrate 703 may be transparent, opaque, or colored. It is also possible to use resin substrates made of polyimide, polyethylene terephthalate, polyether sulfone, polyether ether ketone, potytetrafluoroethylene, polyamide, or polycarbonate. The third substrate 703 may be formed of a metal such as a magnesium alloy.

(First Substrate)

On the first surface 41 of the first substrate 701 shown in FIG. 10, for example, optical elements such as a phase difference plate and a polarizing plate, a touch panel, a cover glass, an antireflection film, etc. can be laminated. For example, a color filter, a phase difference layer, a transparent electrode, an oriented film, or the like may be formed on the second surface 42 of the first substrate 701.

(Second Substrate)

As shown in FIG. 10, at least the display function drive unit 142 including an active element array (TFT array or thin film transistor array) and the third antenna unit 530 are disposed on the third surface 43 of the second substrate 702. In the display function drive unit 142, the active element array drives the display function layer 141 which is a liquid crystal layer. The display function layer 141 is disposed between the second surface 42 of the first substrate 701 and the third surface 43 of the second substrate 702.

A pixel electrode (hereinafter referred to as reflective electrode) that reflects visible light or an oriented film may be formed at a position corresponding to the active element (TFT) on the active element array. The reflective electrode can be formed of aluminum, silver, or a silver alloy that reflects light (external light) in a visible range. When silver or a silver alloy is used in the reflective electrode, it is desirable to use a structure in which the silver alloy layer is sandwiched by conductive metal oxides so as to have a layer configuration of [conductive metal oxide layer/silver alloy layer/conductive metal oxide layer].

The electronic device 500 according to the seventh embodiment may be a transmissive liquid crystal display device in which a reflective electrode is formed of a transparent conductive film such as ITO and a backlight unit such as an LED is inserted in a position on the back surface of the second substrate 702.

As shown in FIG. 11, a plurality of pixel opening members PX (pixels) sectioned by a plurality of source lines 66 and a plurality of gate lines 69 are disposed in an effective display region indicated by Ax-Ay. An active element (thin film transistor array) not shown is formed in each of the plurality of pixel opening members PX. Each of the plurality of source lines 66 is connected to a source signal switching circuit 26 including a shift register, a video line, and an analog switch. Each of the plurality of gate lines 69 is connected to a gate signal switching circuit 27 including a shift register. The source signal switching circuit 26 and the gate signal switching circuit 27 receive signals output from the system control unit 150, which is a display control unit, and control the liquid crystal layer that is the display function layer 141.

(Third Antenna Unit)

The third antenna unit 530 shown in FIG. 11 has two (two sets of) antenna units, each set being composed of a pair of loop antennas whose winding directions are different from each other, i.e., includes a power receiving unit 35 composed of a pair of loop antennas and a video signal receiving unit 36 composed of a pair of loop antennas.

The power receiving unit 35 has a pair of loop antennas composed of a loop antenna 535A and a loop antenna 535B that is arranged with line symmetry to the loop antenna 535A and is inversely wound. The loop antennas 535A and 535B constitute a power receiving antenna unit 535.

The video signal receiving unit 36 has a pair of loop antennas composed of a loop antenna 536A and a loop antenna 536B that is arranged with line symmetry to the loop antenna 536A and is inversely wound. The loop antennas 536A and 536B constitute a video signal receiving antenna unit 536.

The power receiving antenna unit 535 and the video signal receiving antenna unit 536 have structures similar to those of the antenna unit 200 according to the third embodiment described above. However, in the present embodiment, the antenna unit 300 according to the fourth embodiment and the antenna unit 800 according to the fifth embodiment can be adopted.

The power receiving unit 35 is controlled by a first power source control unit 59. The first power source control unit 59 includes, at least, a frequency matching function and a rectifying function. The display control unit 28 receives the power supplied from the first power source control unit 59 and controls the gate signal switching circuit 27 and the source signal switching circuit 26.

The third antenna unit 530 provided on the third surface 43 of the second substrate 702 is superposed on the second antenna unit 520 provided on the fifth surface 45 of the third substrate 703 which will be described later with position accuracy within ±3 μm, for example. Here, the "superpose" means that the third antenna unit 530 and the second antenna unit 520 have the same shape and are disposed at the same position in plan view as viewed in the observation direction in which the observer P views the electronic device 500.

(Third Substrate)

As shown in FIG. 12, on the fifth surface 45 of the third substrate 703, at least, the first antenna unit 510, the second antenna unit 520, the system control unit 150, the secondary battery 156, and the like are disposed.

The second antenna unit 520 is disposed at a position where it is superposed on the third antenna unit 530 in plan view.

The first antenna unit 510 performs a communication function between the outside and the inside of the electronic device 500 and a wireless charging function from the outside of the electronic device 500. The second antenna unit 520 performs communication, power supply, and power reception with respect to the third antenna unit 530.

The second antenna unit 520 and the third antenna unit 530 are superposed on each other and the first antenna unit 510 and the third antenna unit 530 are not superposed on each other in plan view as viewed in the observation direction.

(First Antenna Unit)

The first antenna unit 510 has a pair of loop antennas composed of a loop antenna 531 and a loop antenna 532 that is arranged with line symmetry to the loop antenna 531 and is inversely wound.

The first antenna unit 510 desirably includes a magnetic member layer so as to cover the first antenna unit 510. The size of the secondary battery 156 may be slightly smaller than that of the magnetic member layer.

In the first antenna unit 510, there may be adopted, for example, a configuration in which an adhesive layer is formed on a film of polyimide or the like, a copper foil formed on the adhesive layer is processed so as to have the antenna shape shown in FIG. 12, and a magnetic member layer in which a magnetic member such as ferrite is dispersed is further bonded to the first antenna unit 510.

For example, when the cradle 159 and the first antenna unit 510 resonate, current flows in the same direction in the loops 537 and 538 located at the portion where the loop antennas 531 and 532 are adjacent to each other. Specifically, the current flowing through the loops 537 and 538 flows upward as shown in FIG. 12 in some cases, and flows downward as opposed to the direction shown in FIG. 12 in other cases. That is, the directions of the current flowing through the loops 537 and 538 change alternately. The current flowing through the loops in the same direction promotes electromagnetic coupling between the loop antenna 531 and the loop antenna 532, and contributes to improvement in resonance of the cradle 159 with the antenna. In addition, the action of absorbing positional deviation between the first antenna unit 510 and the cradle 159 occurs.

The loop antennas 531 and 532 constituting the first antenna unit 510 are each obtained by spirally winding a conductive line in a loop shape on the same plane. Further, it may have a loop antenna shape which can be flat-surface mounted on the fifth surface 45. The number of turns of the respective loop antennas 531 and 532 can be selected from the range of 3 to 25, for example. The number of turns of the respective loop antennas 531 and 532 shown in FIG. 12 is 5. As the number of turns of the respective loop antennas, it is possible to select the number of turns that meets conditions from the selection of the resonance frequency and the setting of the impedance of the antenna that is optimum for resonance. The antenna unit area of each of the loop antennas 531 and 532 that constitute the first antenna unit 510 is preferably large. The area of the part indicated by the symbols Bx and By shown in FIG. 12 corresponds to the antenna unit area. The capacitance of the capacitive element, which is omitted in FIG. 12, is adjusted for resonance. Specifically, during wireless charging, the charging control unit 152 adjusts the resonance. In the case of NFC communications, the NFC communication unit 154 adjusts the resonance. Wireless charging and the NFC communications are switched by the switching unit 153 and executed.

The area of the part indicated by the symbols Bx and By is preferably large, but, in the present embodiment, the size of the first antenna unit 510 is not limited.

(Second Antenna Unit)

The second antenna unit 520 shown in FIG. 12 has two (two sets of) antenna units, each set being composed of a pair of loop antennas whose winding directions are different from each other, i.e., includes a power supply unit 33 composed of a pair of loop antennas and a video signal transmitting unit 34 composed of a pair of loop antennas.

The power supplying unit 33 has a pair of loop antennas composed of a loop antenna 533A and a loop antenna 533B that is arranged with line symmetry to the loop antenna 533A and is inversely wound. The loop antennas 533A and 533B constitute a power supplying antenna unit 533.

The video signal transmitting unit 34 has a pair of loop antennas composed of a loop antenna 534A and a loop antenna 534B that is arranged with line symmetry to the loop antenna 534A and is inversely wound. The loop antennas 534A and 534B constitute a video signal transmitting antenna unit 534.

The power supplying antenna unit 533 and the video signal transmitting antenna unit 534 have structures similar to those of the antenna unit 200 according to the third embodiment described above. However, in the present embodiment, the antenna unit 300 according to the fourth embodiment and the antenna unit 800 according to the fifth embodiment can be adopted.

The second antenna unit 520 having such a configuration is superposed on the third antenna unit 530 so that the power supplying unit 33 and the power receiving unit 35 are superposed on each other, and that the video signal transmitting unit 34 and the video signal receiving unit 36 are superposed on each other.

The size of the second antenna unit 520 may be smaller than that of the first antenna unit 510 when the second antenna unit 520 is formed so as to have the width of a frame such as the periphery of an electronic device such as a display.

Eighth Embodiment

With reference to FIGS. 13 to 22, an electronic device 600 according to an eighth embodiment will be described.

Figure 13:
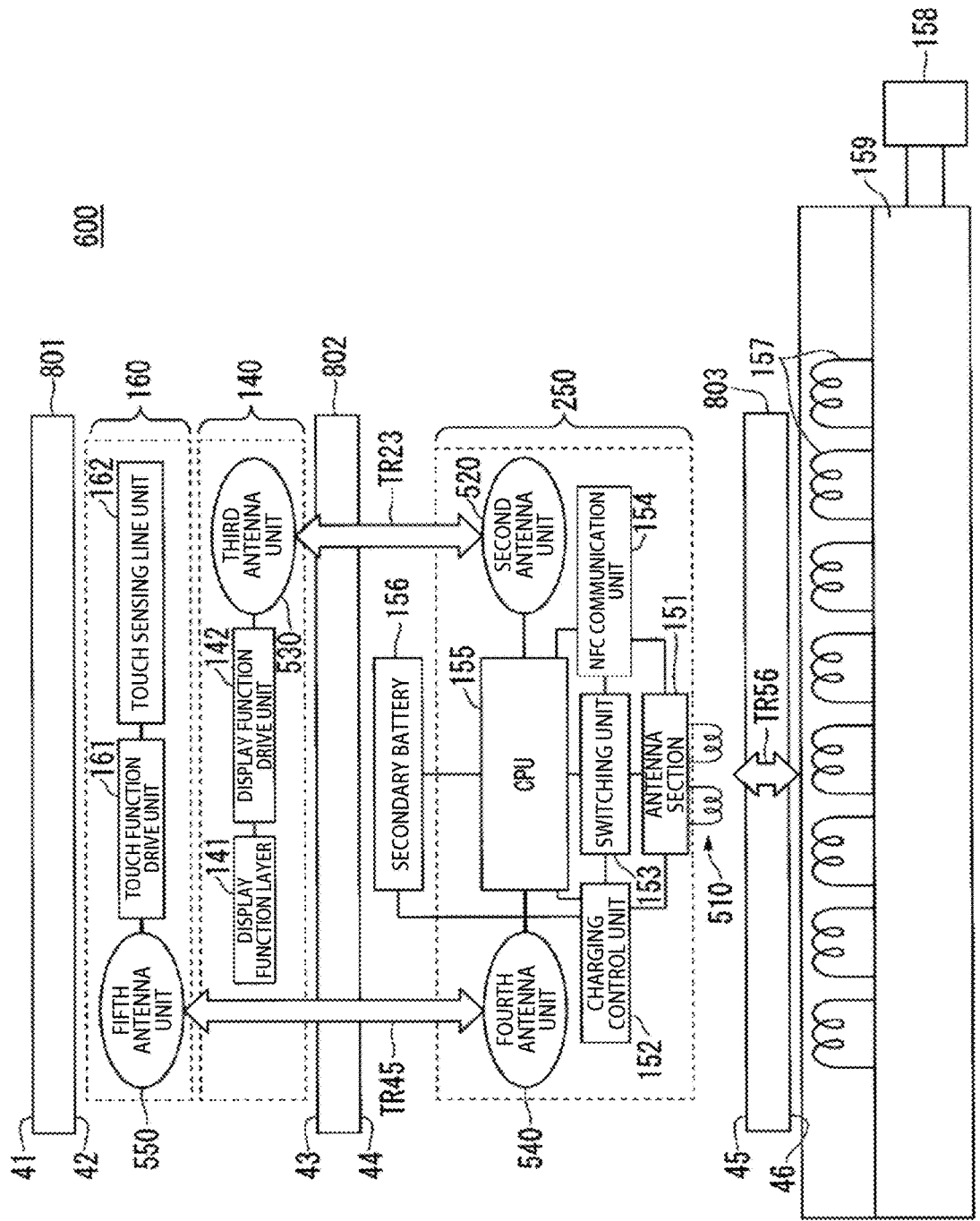
Figure 14:
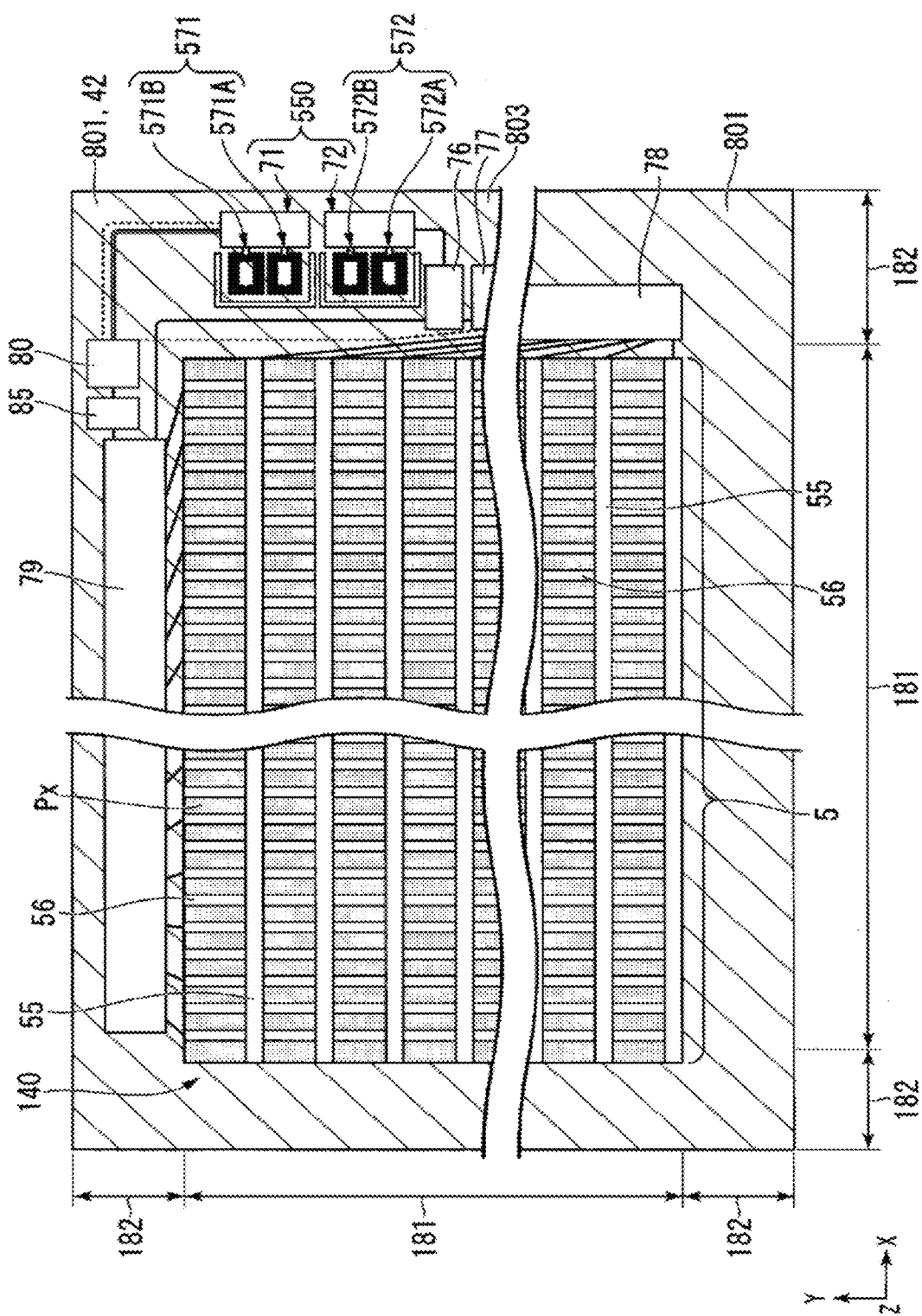
FIG. 14 is a plan view of a first substrate provided with a loop antenna unit constituting the electronic device according to the eighth embodiment of the present invention.
Figure 15:
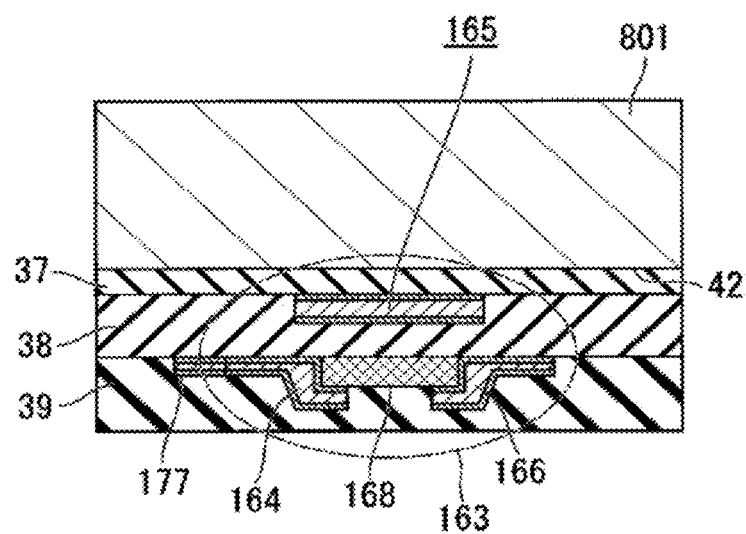
FIG. 15 is a cross-sectional view of the first substrate constituting the electronic device according to the eighth embodiment of the present invention, which shows a structure of a thin film transistor.
Figure 16:
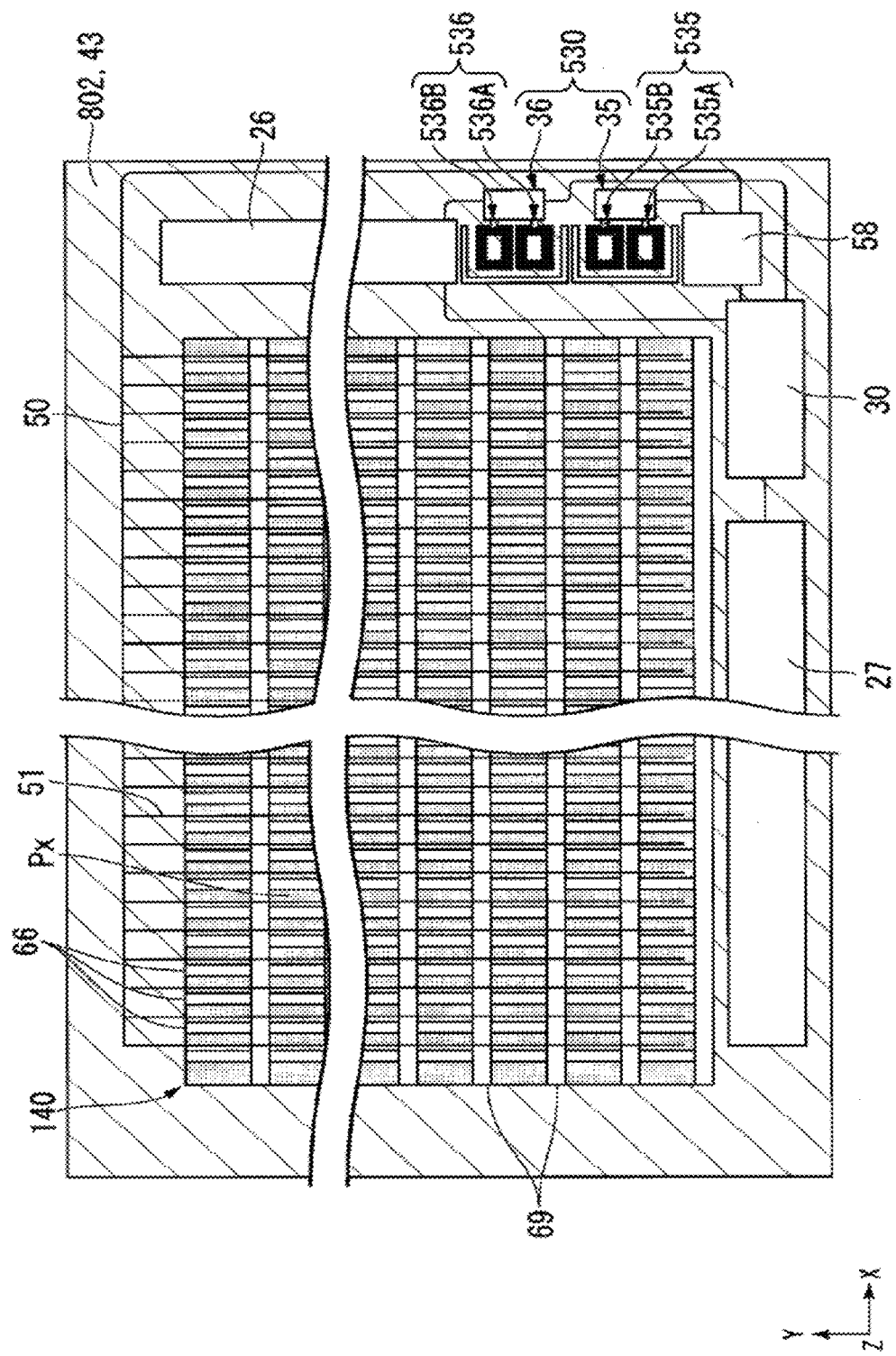
FIG. 16 is a cross-sectional view of a third thin film transistor provided on a second surface of the first substrate constituting the electronic device according to the eighth embodiment of the present invention.
Figure 17:
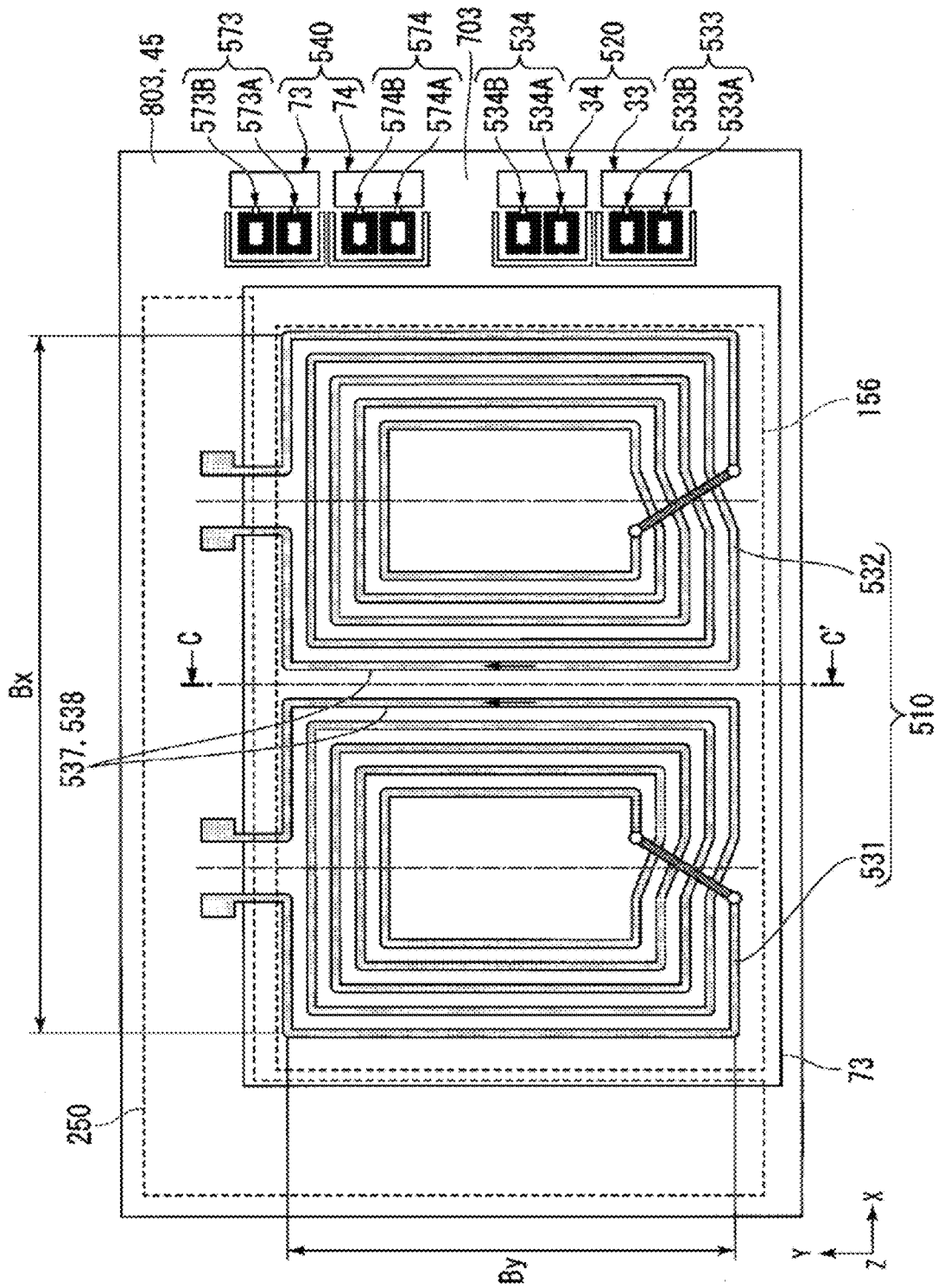
FIG. 17 is a plan view of a third substrate provided with the loop antenna unit constituting the electronic device according to the eighth embodiment of the present invention.
Figure 18:
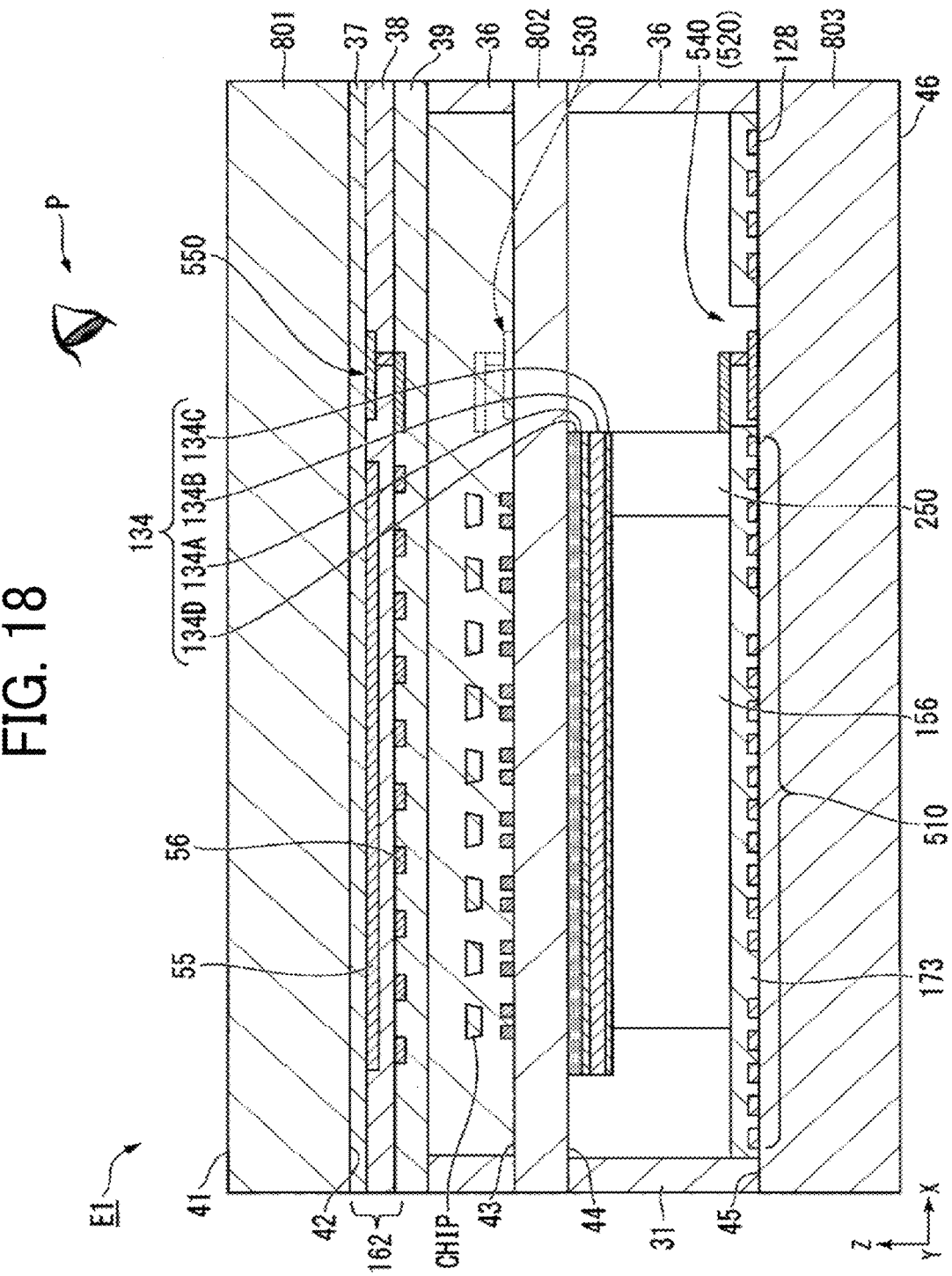

FIG. 13 is a block diagram of an electronic device according to the eighth embodiment including a loop antenna and the like. FIG. 14 is a plan view of a first substrate provided with a loop antenna unit constituting the electronic device according to the eighth embodiment of the present invention. FIG. 15 is a cross-sectional view of the first substrate constituting the electronic device according to the eighth embodiment, which shows a structure of a thin film transistor. FIG. 16 is a cross-sectional view of a third thin film transistor provided on a second surface of the first substrate constituting the electronic device according to the eighth embodiment. FIG. 17 is a plan view of a third substrate provided with a loop antenna unit constituting the electronic device according to the eighth embodiment. FIG. 18 is a cross-sectional view of the electronic device according to the eighth embodiment including a loop antenna and the like. In FIGS. 13 to 22, components identical to those of the embodiment described above are given the same reference signs to omit or simplify description.

In the following description, a line related to touch sensing may simply be termed a touch sensing line, a touch driving line, a touch detection line, a touch line, a touch electrode and a touch signal, respectively. A voltage applied to the touch sensing line to perform touch sensing driving is termed a touch driving voltage. A touch sensing line unit is composed of a plurality of parallel first conductive lines (first touch lines) and a plurality of parallel second conductive lines (second touch lines) via an insulating layer. Hereinafter, the first conductive lines and second conductive lines are sometimes referred to simply as conductive lines or touch lines. For example, a drive control unit related to touch sensing is sometimes abbreviated as a touch driving control unit or the like. The first conductive lines and the second conductive lines are orthogonal to each other in plan view.

(Functional Configuration of Electronic Device)

In the electronic device 600 according to the eighth embodiment, a plurality of light emitting diode elements called micro LEDs are adopted as the display function layer. For example, a display unit is formed by arranging a plurality of red light emitting diode elements, a plurality of green light emitting diode elements, and a plurality of blue light emitting diode elements in a matrix on a thin film transistor array.

As shown in FIG. 13, the electronic device 600 includes a first substrate 801, a second substrate 802, and a third substrate 803. The first substrate 801, the second substrate 802, and the third substrate 803 are layered on each other in this order in plan view as viewed in the observation direction.

The first substrate 801 has a first surface 41 and a second surface 42. The second substrate 802 has a third surface 43 and a fourth surface 44. The third substrate 803 has a fifth surface 45 and a sixth surface 46.

As shown in FIG. 13, the electronic device 600 includes a touch sensing unit 160, the display unit 140, and a system control unit 250. The system control unit 250 is a control unit that controls the touch sensing function, the display function, the communication function, and the wireless charging function.

(Touch Sensing Unit)

The touch sensing unit 160 (touch sensing function layer) includes a fifth antenna unit 550, a touch function drive unit 161, and a touch sensing line unit 162. The fifth antenna unit 550 and the touch sensing line unit 162 are electrically connected to the touch function driver 161. In the touch sensing unit 160, the touch function drive unit 161 controls the touch sensing function (for example, an electrostatic capacitive type touch sensing function) using the touch sensing line unit 162.

The fifth antenna unit 550, the touch function drive unit 161, and the touch sensing line unit 162 are disposed on the second surface 42 of the first substrate 801 which will be described later. The fifth antenna unit 550 is superposed on a fourth antenna unit 540 provided on the third substrate 803, which will be described later, in plan view as viewed from the observer side.

(Display Unit)

The display unit 140 is disposed between the second surface 42 of the first substrate 801 and the third surface 43 of the second substrate 802 which will be described later, and includes the display function layer 141, the display function drive unit 142, and the third antenna unit 530. The third antenna unit 530 and the display function layer 141 are electrically connected to the display function drive unit 142. In the display unit 140, the display function drive unit 142 (thin film transistor array) controls the display function layer 141.

The display function layer 141, the display function drive unit 142, and the third antenna unit 530 are disposed on the third surface 43 of the second substrate 802 which will be described later. As described above, the display function layer 141 includes a plurality of light emitting diode elements and a thin film transistor array. The third antenna unit 530 is superposed on the second antenna unit 520 provided on the third substrate 803 in plan view as viewed from the observer side.

(System Control Unit)

The system control unit 250 includes the fourth antenna unit 540 in addition to the configuration of the system control unit 150 according to the seventh embodiment described above. The fourth antenna unit 540 is connected to the CPU 155.

In the present embodiment, the system control unit 250 controls the touch sensing function of the touch sensing unit 160, the display function of the display unit 140, the communication function, and the wireless charging function.

The system control unit 250 performs transmission/reception of various signals related to the touch sensing between the touch sensing unit 160 and the system control unit 250, in a wireless manner, via the fifth antenna unit 550 and the fourth antenna unit 540, as shown by an arrow indicated by the symbol TR45, and performs supply and reception of power required for driving the touch sensing in a wireless manner. Also, as is the case with the system control unit 150, the system control unit 250 wirelessly performs transmission/reception of various signals related to the drive of the display function layer via the third antenna unit 530 and the second antenna unit 520, as shown by the arrow indicated by the symbol TR23 and wirelessly performs supply and reception of power required for driving the display function layer.

(First Substrate)

As shown in FIG. 13 or FIG. 14, the touch sensing unit 160 composed of the fifth antenna unit 550, the touch function drive unit 161, and the touch sensing line unit 162 is disposed on the second surface 42 of the first substrate 801. The fifth antenna unit 550 is superposed on the fourth antenna unit 540 provided on the third substrate 803 in plan view as viewed in the observation direction.

On the second surface 42 of the first substrate 801, a plurality of first conductive lines 55 extending in parallel to the X direction and a plurality of second conductive lines 56 extending in parallel to the Y direction are formed. The touch sensing line unit 162 is formed by the first conductive lines 55 and the second conductive lines 56.

On the second surface 42 of the first substrate 801, the first conductive lines 55, the second conductive lines 56, the fifth antenna unit 550, a touch power receiving unit 72, a power source control unit 76, a touch driving control unit 77, a touch driving switching circuit 78, a touch detection switching circuit 79, a touch signal transmission/reception control unit 80, and a detection and AD conversion unit 85 are provided. The power source control unit 76 desirably includes a booster circuit. Some of the first conductive lines 55 and some of the second conductive lines 56 are used as lines for electrically connecting the fifth antenna unit 550 and circuits such as the touch driving switching circuit 78 and the touch detection switching circuit 79.

The touch power receiving unit 72, the power source control unit 76, the touch driving control unit 77, the touch driving switching circuit 78, the touch detection switching circuit 79, the touch signal transmission/reception control unit 80, the detection and AD conversion unit 85, and the like shown in FIG. 14 function as the touch sensing function drive unit. The circuit that controls touch sensing includes some of the same conductive lines as the first conductive lines 55, some of the same conductive lines as the second conductive lines 56, and a plurality of third thin film transistors. The touch power receiving unit 72 smoothes a received voltage and outputs a constant voltage to the power source control unit 76 as a touch driving voltage. It should be noted that some of the same conductive lines as the second conductive lines 56 can be applied to lines having a two-layer structure with the first conductive lines 55 of the fifth antenna unit 550 via a through hole for electrical connection and an insulating layer.

The phrase "some of the same conductive lines" means, for example, the use of conductive layers having the same configuration as the first conductive lines 55 for a purpose different from that of the touch sensing line, in a line or pattern different from the first conductive lines 55. In this way, lines different from the first conductive lines 55 may be used, for example, in the jumper wire that constitutes the antenna unit, and this also means that it is a leading wire connected to the conductive line.

The fifth antenna unit 550 has two (two sets of) antenna units, each set being composed of a pair of loop antennas whose winding directions are different from each other, i.e., includes the touch power receiving unit 72 (first power receiving unit) composed of a pair of loop antennas and a touch signal receiving unit 71 composed of a pair of loop antennas. In the pair of loop antennas, the winding directions are opposite to each other and the number of turns is 3 or more.

The touch power receiving unit 72 has a pair of loop antennas composed of a loop antenna 572A and a loop antenna 572B that is arranged with line symmetry to the loop antenna 572A and is inversely wound. The loop antennas 572A and 572B constitute a touch power receiving antenna unit 572.

The touch signal receiving unit 71 has a pair of loop antennas composed of a loop antenna 571A and a loop antenna 571B that is arranged with line symmetry to the loop antenna 571A and is inversely wound. The loop antennas 571A and 571B constitute a touch signal receiving antenna unit 571.

As will be described later, transmission/reception of touch signals and supply and reception of power required for touch sensing are performed in a wireless manner between the fourth antenna unit 540 provided on the third substrate 803 and the fifth antenna unit 550 provided on the first substrate 801. As a method of forming such a plurality of loop antennas, for example, planar loop antennas each formed by patterning a copper foil formed on a polyimide film may be mounted on the third substrate 803.

FIG. 15 is a cross-sectional view showing a third thin film transistor 163 formed as an active element on the second surface 42 of the first substrate 801.

The third thin film transistor 163 disposed on the second surface 42 of the first substrate 801 has a bottom gate structure as shown in FIG. 15, and is formed, for example, in a frame region 182 of the first substrate 801. The third thin film transistor 163 is formed on the second surface 42 of the first substrate 801 via a fourth insulating layer 37. Although a black matrix as the base is omitted in FIG. 15, the black matrix may be previously formed on the first substrate 801.

In the third thin film transistor 163, the gate electrode 165 is formed of conductive lines having the same configuration as that of the first conductive lines 55 and formed by the same process as that of the first conductive lines 55. On the gate electrode 165, a gate insulating layer (insulating layer 38), a channel layer 168, a drain electrode 166, and a source electrode 164 are laminated. The gate electrode 166 and the source electrode 164 are each formed of conductive lines having the same configuration as that of the second conductive lines 56 and formed by the same process as that of the second conductive lines 56.

The plurality of third active elements 163 and a resistive element formed by patterning a film of a conductive metal oxide layer or an oxide semiconductor can form circuits such as the touch driving switching circuit 78, the touch detection switching circuit 79, the touch signal transmission/reception control unit 80, the wave detection and AD conversion unit 85, the touch power receiving unit 72, the power source control unit 76, and the touch driving controlling unit 77. A capacitor (capacitive element) required for the fifth antenna unit 550 can be formed when the first conductive lines 55 and the second conductive lines 56 are formed via an insulating layer. Specifically, the capacitor can be formed by patterning the conductive layer having the same configuration as that of the first conductive lines 55 and the second conductive lines 56 and positioned in the same layer so as to have a desired size above and below the insulating layer 38. The channel layer 168 constituting the third thin film transistor 163 is formed of an oxide semiconductor or a polysilicon semiconductor. The transistor structure is not limited to the bottom gate structure. It may be a top gate structure, a double gate structure, or a structure further including a back gate electrode.

As shown in FIG. 18, the touch sensing line unit 162 is provided on the second surface 42 of the first substrate 801. The fifth insulating layer 38 is disposed between the first conductive lines 55 and the second conductive lines 56 that constitute the touch sensing line unit 162 in the thickness direction (Z direction) of the first substrate 801. In the process of forming the touch sensing line unit 162, the fourth insulating layer 37 may be formed on the second substrate surface before forming the conductive lines (first conductive lines 55). It is preferable to form a sixth insulating layer 39 on the respective second conductive lines 56. The display unit 140 including a thin film transistor array not shown, the LED chip CHIP, the third antenna unit 530, and the like is provided on the third surface 43 of the second substrate 802.

(Second Substrate)

As shown in FIG. 13, the display unit 140 composed of the display function layer 141, the display function drive unit 142, and the third antenna unit 530 is disposed on the third surface 43 of the second substrate 802. The display function layer 141 is composed of a plurality of light emitting elements (light emitting diode elements) and a thin film transistor array as described above. The third antenna unit 530 is superposed on the second antenna unit 520 formed on the third substrate 803 in plan view.

On the third surface 43 of the second substrate 802, the third antenna unit 530, the source signal switching circuit 26, the gate signal switching circuit 27, the second power receiving unit 35, the video signal receiving unit 36, the second power source control unit 58, and other circuits are provided. The second power source control unit 58 preferably includes a booster circuit. On the second substrate 802, at positions corresponding to the pixel opening members PX, a first thin film transistor 67 and a second thin film transistor 68 that drive the display function layer 141 are provided. Note that, in FIG. 16, the first thin film transistor 67 and the second thin film transistor 68 are omitted. The third antenna unit 530 has two sets of antenna units, each set being composed of a pair of loop antennas whose winding direction is different from each other and whose number of turns is 3 or more, i.e., has the power receiving antenna unit 535 and the video signal receiving unit 536.

Transmission/reception of various signals related to the driving of the display function layer is wirelessly performed between the second antenna 520 and the third antenna unit 530 provided on the third substrate 803, and supply and reception of power required for driving the display function layer is performed in a wireless manner.

Specifically, the video signal receiving antenna unit 536 receives a signal related to image display. The power receiving antenna unit 535 receives power necessary for driving the display function layer 141 (more specifically, driving the first thin film transistor 67 and the second thin film transistor 68).

The number of turns of the respective loop antennas that constitute the third antenna unit 530 can be selected from the range of 3 to 25, for example. The roles of the first thin film transistor 67 and the second thin film transistor 68 that drive the display function layer 141 will be described later.

(Third Substrate)

As shown in FIG. 17, on the fifth surface 45 of the third substrate 803, at least, the first antenna unit 510, the second antenna unit 520, the fourth antenna unit 540, the system control unit 250, the secondary battery 156, and the like are disposed.

As described above, in plan view, the second antenna unit 520 is disposed at a position where it is superposed on the third antenna unit 530, and the fourth antenna unit 540 is disposed at a position where it is superposed on the fifth antenna unit 550.

The first antenna unit 510 performs a communication function between the outside and the inside of the electronic device 500 and a wireless charging function from the outside of the electronic device 500. The second antenna unit 520 performs communication, power supply, and power reception with respect to the third antenna unit 530.

The second antenna unit 520 and the third antenna unit 530 are superposed on each other and the fourth antenna unit 540 and the fifth antenna unit 550 are superposed on each other in plan view as viewed in the observation direction. The first antenna unit 510 is supposed neither on the second antenna unit 520 nor on the fourth antenna unit 540.

The first antenna unit 510 has a pair of loop antennas composed of a loop antenna 531 and a loop antenna 532 that is arranged with line symmetry to the loop antenna 531 and is inversely wound. The number of turns of the respective loop antennas 531 and 532 can be selected from the range of 3 to 25, for example. As the number of turns of the respective loop antennas, it is possible to select the number of turns that meets conditions from the selection of the resonance frequency and the setting of the impedance of the antenna that is optimum for resonance. The size of the first antenna unit 510 (for example, the area of the part indicated by the symbols Bx and By) is preferably large. The capacitance of the capacitive element, which is omitted in FIG. 17, is adjusted for resonance. Specifically, during wireless charging, the charging control unit 152 adjusts the resonance. In the case of NFC communications, the NFC communication unit 154 adjusts the resonance. Wireless charging and the NFC communications are switched by the switching unit 153 and executed.

The fourth antenna unit 540 has two (two sets of) antenna units, each set being composed of a pair of loop antennas whose winding directions are different from each other, i.e., includes the touch power supplying unit 74 composed of a pair of loop antennas and the touch signal receiving unit 73 composed of a pair of loop antennas. In the pair of loop antennas, the winding directions are opposite to each other and the number of turns is 3 or more.

The touch power supplying unit 74 has a pair of loop antennas composed of a loop antenna 574A and a loop antenna 574B that is arranged with line symmetry to the loop antenna 574A and is inversely wound. The loop antennas 574A and 574B constitute a touch power receiving antenna unit 574.

The touch signal receiving unit 73 has a pair of loop antennas composed of a loop antenna 573A and a loop antenna 573B that is arranged with line symmetry to the loop antenna 573A and is inversely wound. The loop antennas 573A and 573B constitute a touch signal receiving antenna unit 573.

As shown in FIG. 18, the first antenna unit 510, the second antenna unit 520, the fourth antenna unit 540, the magnetic member layer 173, the secondary battery 156, the system control unit 250, the conductive shield layer 134 and the like are provided between the fourth surface 44 of the second substrate 802 and the fifth surface 45 of the third substrate 803.

Electronic devices such as an LTE communication module, a WiFi communication module, and a GPS receiving module may be further mounted between the fourth surface 44 of the second substrate 802 and the fifth surface 45 of the third substrate 803.

(Magnetic Member Layer)

As shown in FIG. 18, the magnetic member layer 173 is provided on the fifth surface 45. For example, when the metal layer laminated on the lithium battery package (secondary battery casing) that is the secondary battery 156 is arranged near a loop antenna 128, the magnetic member layer 173 can be used to improve the antenna efficiency.

As a material applicable to the magnetic member layer 173, a structure obtained by processing, into a desired shape, a sheet in which a material such as Ni—Zn ferrite, Mn—Zn ferrite, Fe—Si-based amorphous material, Fe—Ni-based permalloy or the like is dispersed or oriented in a synthetic resin or rubber. Alternatively, an amorphous film made of the above material may be formed on the top surface of the fifth surface 45 by a vacuum film forming method. The magnetic member layer formed of an amorphous film can be suitably used as a completely solid-state electronic device when the secondary battery is applied to a solid-state lithium battery.

(Secondary Battery)

Further, the secondary battery 156 is provided at a position adjacent to the system control unit 250 between the second substrate 802 and the third substrate 803. The structure and type of the secondary battery 156 are the same as those in the seventh embodiment described above.

(Conductive Line)

As the conductive lines according to the present embodiment, a laminated film obtained by laminating a copper foil on a resin such as polyimide or polyethylene terephthalate can be used. It is also possible to use a laminated configuration in which a plurality of layers made of the above materials are laminated.

When the plurality of substrates (first substrate 801, second substrate 802, and third substrate 803) constituting the electronic device 600 are not made of a resin but glass or ceramics, it is convenient to use, as the structure of the conductive lines, a three-layer structure composed of [conductive metal oxide layer/copper (copper alloy) layer/conductive metal oxide layer]. Such three layers can be laminated on a substrate by a vacuum film forming process such as vapor deposition or sputtering, and a line pattern of the conductive lines can be formed by a known method of generally used photolithography.

In general, there is a concern that non-conductive copper oxide may be formed on the surface of the copper layer or the copper alloy layer over time, resulting in poor electrical contact.

On the other hand, a composite oxide layer made such as of indium oxide, zinc oxide, antimony oxide, gallium oxide, or tin oxide can achieve stable ohmic contact and facilitate electrical implementation through conductive transfer or a contact hole.

For example, when antimony oxide is used, metal antimony is unlikely to form a solid solution area with copper and suppresses dispersion of copper in the laminated configuration. Antimony oxide or the like can be added to the conductive metal oxide layer for the purpose of suppressing the dispersion of copper. Titanium, zirconium, magnesium, aluminum, germanium or other elements can also be added to the conductive metal oxide layers.

Also, copper layers or copper alloy layers are poorly adhesive to a transparent resin and a glass substrate (applied to the first substrate, the second substrate, and the third substrate). If the copper layer or the copper alloy layer is applied to the substrate as it is, it will be hard to produce a practical substrate for electronic devices. The conductive metal oxide, however, is sufficiently adhesive to a light absorbing resin layer, a black matrix, a transparent resin, a glass substrate and the like, and also sufficiently adhesive to a copper layer and a copper alloy layer. Accordingly, if a copper layer or a copper alloy layer that contains a composite oxide is applied to the substrate for electronic devices, a practical substrate for electronic devices can be produced.

When the conductive lines are applied to the loop antenna or the antenna unit according to the present embodiment, a low resistance is required for the conductive lines of the antenna. Therefore, the copper (or copper alloy) layer included in the configuration of the conductive lines is desirably formed to be thick.

(Conductive Shield Layer)

As shown in FIG. 18, the conductive shield layer 134 is provided on the fourth surface 44 of the second substrate 802. In FIG. 18, the conductive shield layer 134 has a configuration in which a light absorbing layer 134D, a first conductive metal oxide layer 134A, a copper alloy layer 134B, and a second conductive metal oxide layer 134C are laminated in this order from the fourth surface 44. By adopting a conductive layer (copper alloy layer 134B) having a low resistance as a part of the conductive shield layer 134, it is possible to reduce the influence of noise generated from the system controller 250 and the loop antenna on the touch sensing function layer (fifth antenna unit 550 and touch function drive unit 161), and the display function layer 141.

The conductive layer of the conductive shield layer 134 has only to be a conductive film having a sheet resistance of 100Ω/□ (Ω/sq) or less. The conductive metal oxide layers may each have a laminated structure or a single layer structure. A single layer configuration of a metal layer of molybdenum, aluminum, copper, silver, nickel or the like or an alloy layer, or a configuration in which a plurality of these metal layers are laminated can also be adopted. By adding a metal layer or an alloy layer having high thermal conductivity to the conductive shield layers, it is possible to contribute to the dissipation of heat related to the light emission of the light emitting elements.

(Circuit Formation with Thin Film Transistor)

In the present embodiment, a resistive element can be formed by forming a conductive metal oxide layer or a film of an oxide semiconductor in a desired pattern. In addition, forming on the first substrate 801 and the second substrate 802 a matrix of a thin film transistor (active element) having a polysilicon semiconductor as a channel layer before forming a through-hole in the insulating layer can laminate via the through-hole a matrix of a thin film transistor (active element) using an oxide semiconductor as a channel layer. In a two-story configuration in which a matrix of a thin film transistor using an oxide semiconductor is further laminated on a matrix of a thin film transistor using a polysilicon semiconductor as a channel layer, for example, a layer of the gate line and the gate electrode of the polysilicon thin film transistor and a layer of the source line, the source electrode, and the drain electrode of the oxide semiconductor thin film transistor can be each patterned by using the same materials and in the same configuration in the same layer.

As the line layer, a conductive line having a three-layer configuration of [conductive metal oxide layer/copper (copper alloy) layer/conductive metal oxide layer] described above can be applied.

An inverter circuit and an SRAM can be formed by a well-known technique with a resistive element and an n-type thin film transistor. Similarly, a logical circuit such as a ROM circuit, a NAND circuit, a NOR circuit, a flip-flop, a shift register, and the like can be formed. Oxide semiconductors can form a power-saving circuit since they have a very small leakage current. Further, oxide semiconductors can provide a good memory element since they have memory properties (voltage retention properties) that silicon semiconductors do not have. Alternatively, in the second substrate 802, an active element matrix that uses a polysilicon semiconductor as a channel layer may be laminated as a first layer, and an active element matrix that uses an oxide semiconductor as a channel layer may be laminated as a second layer to form the memory and logic circuit described above. The channel layer may also be formed of a polysilicon semiconductor or an amorphous silicon semiconductor as necessary.

By the above technique, a circuit including a switching element can be formed on the second surface 42 of the first substrate 801 and the third surface 43 of the second substrate 802.

Next, a peripheral structure of the light emitting element CHIP (LED chip or light emitting diode element) will be described with reference to FIGS. 19 and 20.

Figure 19:
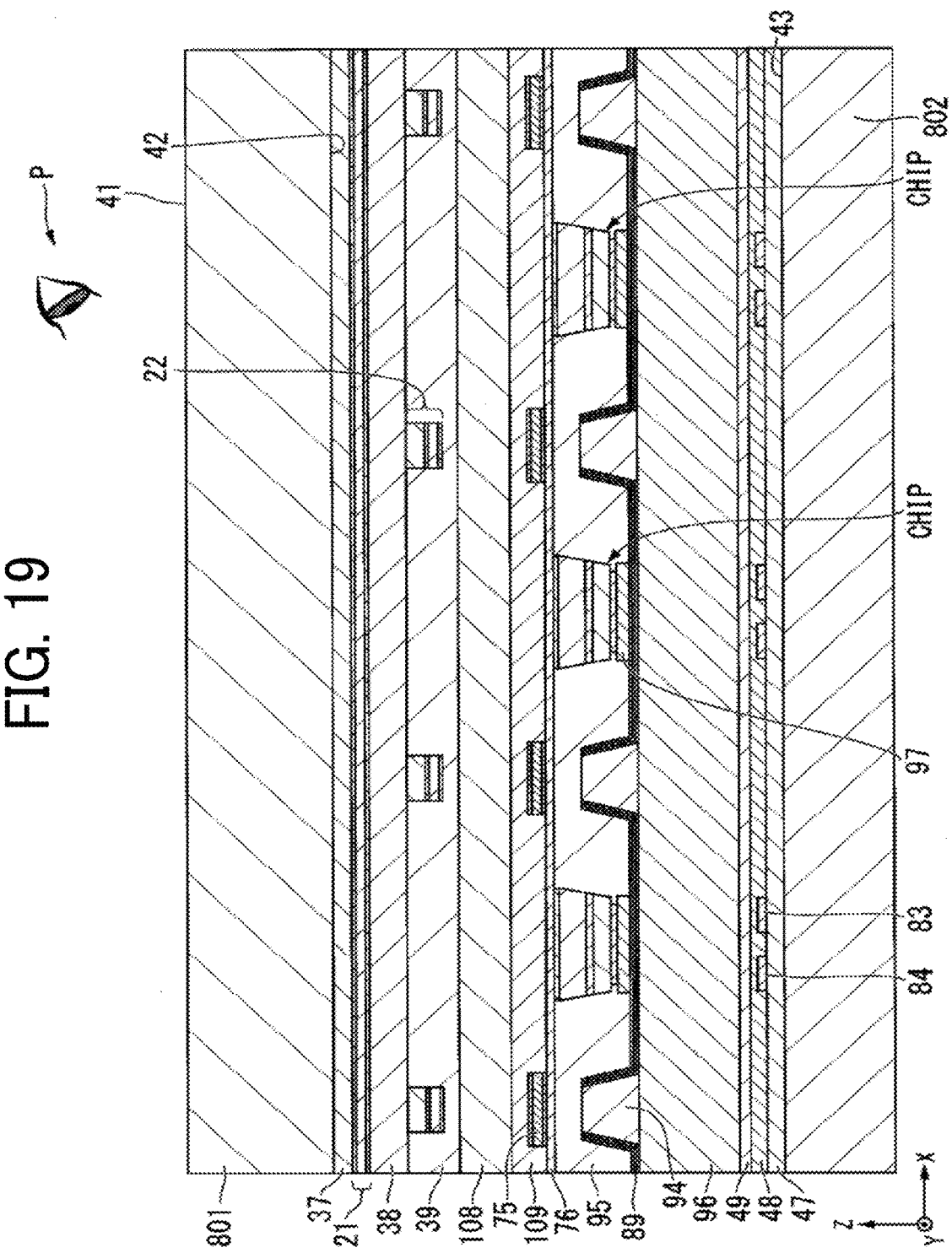
FIG. 19 is an enlarged view partially showing the electronic device shown in FIG. 18, which is a cross-sectional view of a structure between the first substrate and the second substrate.

FIG. 19 is an enlarged view partially showing the electronic device shown in FIG. 18, which is a cross-sectional view of a structure between the first substrate and the second substrate. FIG. 20 is a cross-sectional view of the electronic device according to the eighth embodiment, showing, in an enlarged manner, a part including the display function layer and the second thin film transistor provided on the second substrate constituting the electronic device. FIG. 21 is a cross-sectional view of the electronic device shown in FIG. 20, showing the light emitting element in an enlarged/manner.

(Light Emitting Element)

A lower electrode 88 constituting the light emitting element CHIP is electrically linked to a reflective electrode 89 via a joining layer 97. The reflective electrode 89 is connected via the through hole 93 to the second thin film transistor 68 that functions as a drive transistor that drives the light emitting element CHIP.

The light emitting element CHIP receives power supplied from a first power source line 51 (power source line) via a second thin film transistor 68.

The surface layer (top surface layer) of an upper electrode 87 is formed of a conductive metal oxide. A transparent conductive film 176 and an auxiliary conductor 83 are conductive layers having a structure in which copper or a copper alloy is sandwiched between conductive metal oxides, and are formed in the same layer and by the same process. In FIG. 20, the auxiliary conductor 83 extends, for example, in the front-back direction of the paper surface, that is, in the Y direction. The auxiliary conductor 83 communicates with a second power source line 52 (power source line; see FIG. 22) extending in the X direction. The arrangement of the first power source line 51 and the second power source line 52 in plan view will be described later with reference to FIG. 22.

For the joining layer 97, for example, a conductive material that can be electrically connected by fusing the lower electrode 88 of the light emitting element CHIP and the reflective electrode 89 within the temperature range of 150° C. to 340° C. can be applied. A conductive filler such as silver, carbon or graphite may be dispersed in a thermally flowable resin as the conductive material. Alternatively, the joining layer 97 can be formed by using In (indium), an InBi alloy, an InSb alloy, an InSn alloy, an InAg alloy, an InGa alloy, an SnBi alloy, an SnSb alloy, or the like, or a low-melting-point metal that is a ternary or quaternary system of these metals.

Since these low-melting-point metals have good wettability to the above-described conductive metal oxides, the lower electrode 88 and the reflective electrode 89 can be self-alignedly fused after the lower electrode 88 and the reflective electrode 89 are roughly arranged. As the energy required for fusion, various energies such as heat, pressure, electromagnetic waves, laser light and a combination thereof with ultrasonic waves are used. Vertical light emitting diodes have an advantage that repair can be easily performed when joint defects occurs. Horizontal light emitting diodes in which electrodes are arranged in the same direction have disadvantages that it is difficult to inspect the joints of individual diodes, and that the electrodes are easily short-circuited during repair (replacement of a defective diode, etc.). From this viewpoint, vertical light emitting diodes are preferably used. The joining layer 97 can be pattern-formed by a well-known photolithography method or a lift-off means after film formation such as vacuum film formation.

In the present embodiment, the light emitting element CHIP is a vertical light emitting diode that functions as the display function layer, and is provided in each of the plurality of pixel opening members PX.

The light emitting element CHIP has a structure in which the upper electrode 87, an n-type semiconductor layer 90, a light emitting layer 92, a p-type semiconductor layer 91, and the lower electrode 88 are layered in this order. In other words, the light emitting device CHIP has a configuration in which the p-type semiconductor layer 91, the light emitting layer 92, the n-type semiconductor layer 90, and the upper electrode 87 are layered in this order on the lower electrode 88. As shown in FIG. 21, the electrodes used for LED light emission are formed on different surfaces, and are formed on surfaces facing each other. Further, the upper electrode 87 and the lower electrode 88 are arranged outside the surfaces facing the n-type semiconductor layer 90 and the p-type semiconductor layer 91, respectively, which are laminated so as to be parallel to each other. A light emitting element CHIP having such a structure is referred to as a vertical light emitting diode in the present embodiment. When the LED structure has an atypical shape such as a pyramid shape in a cross-sectional view, it is not used as the vertical light emitting diode in embodiments of the present invention. In the LED structure, a structure in which electrodes are formed so as to be arranged on one surface or a structure in which electrodes are formed so as to be arranged in the horizontal direction is called a horizontal light emitting diode.

As shown in FIG. 21, on the light emitting element CHIP, the transparent conductive film 176 overlaps with the upper electrode 87 and is electrically connected. A corner portion 171 of the light emitting element CHIP is covered with a second flattening layer 95. On the light emitting element CHIP, an overlapping portion 174 where the second flattening layer 95 and the upper electrode 87 overlap with each other is formed. Since the overlapping portions 174 are formed at both ends of the upper electrode 87, the second flattening layer 95 has a concave shape on the upper electrode 87.

As the configuration of the transparent conductive film 176, a single layer of a conductive metal oxide or a plurality of layers of conductive metal oxides is adopted. For example, a configuration in which an Ag or Ag alloy layer is sandwiched between conductive metal oxides such as ITO may be adopted. Further, the auxiliary conductor 83 including a metal layer may be laminated on the transparent conductive film 176. Forming the auxiliary conductor 83 including a metal layer on the transparent conductive film 176 can reduce the resistance value of the transparent conductive film 176 and contribute to the dissipation of heat generated in the light emitting element CHIP.

Figure 22:
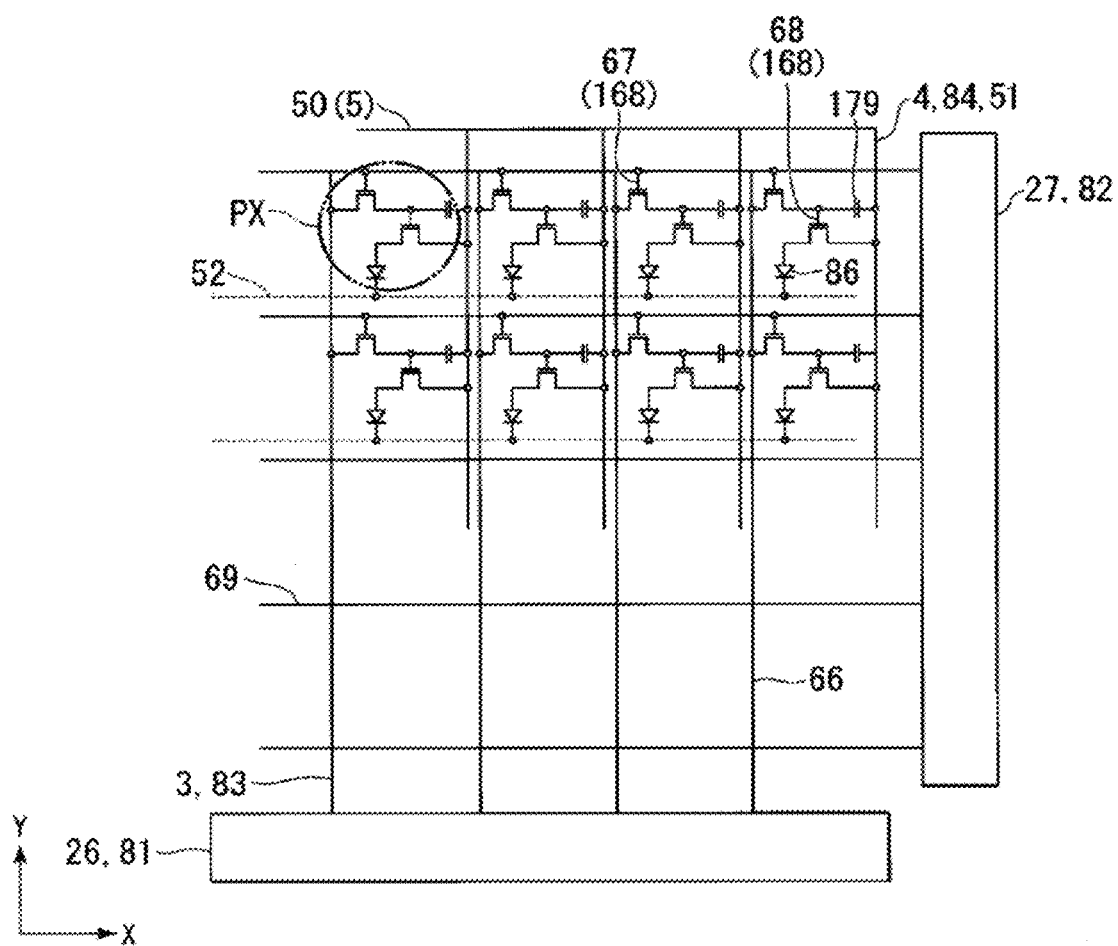
FIG. 22 is a typical circuit diagram including a thin film transistor which drives the light emitting element applied to the electronic device according to an embodiment of the present invention.

The transparent conductive film 176 is the power source line 52 shown in FIG. 22. The transparent conductive film 176 functions as a cathode or common electrode of a light emitting element (light emitting diode or organic EL). In this case, the transparent conductive film 176 functions as a shield layer of the touch sensing unit 160, and has an effect of suppressing the influence of electrical noise generated from the system control unit 250 and the NFC communication unit 154.

The overlapping portion 174 is located between the transparent conductive film 176 and the upper electrode 87 at the corner portion 171, and is inclined relative to the surface of the upper electrode 87, for example, at an angle θ of 5° to 70°. Since the overlapping portion 174 has an inclination in this manner, it is possible to prevent disconnection of the transparent conductive film 176.

When an upper surface 178 (surface layer) of the light emitting element CHIP protrudes from the second flattening layer 95 and does not overlap with the second flattening layer 95, that is, when the overlapping portion 174 is not formed, the transparent conductive film 176 is likely to be disconnected, leading to a concern that defective lighting of the light emitting element CHIP may occur.

Well-known photolithography is adopted as a method of forming the second flattening layer 95 having the concave shape as described above and a method of forming the overlapping portion 174 overlapping with the light emitting element CHIP. Furthermore, in addition to the well-known photolithography method, a dry etching technique or an ultraviolet cleaning technique may be applied.

As the shape of the light emitting element CHIP, for example, a square shape having a side length of 3 μm to 500 μm can be applied in plan view. However, shapes other than squares and rectangles may be applied. Alternatively, the size of one side may be 500 μm or more. Further, in plan view, one or two or more light emitting elements can be mounted in the pixel opening members PX sectioned by the first conductive lines 55 and the second conductive lines 56. In mounting of the light emitting element CHIP, for example, the direction of the square light emitting element CHIP can be randomly rotated in units of 90 degrees. By randomly mounting the light emitting element CHIP, it is possible to reduce color unevenness and brightness unevenness of the entire screen due to slight variations in LED crystal growth.

Examples of the n-type semiconductors and the p-type semiconductors that can be applied to the light emitting element such as LED include compounds of Group II to Group VI elements of the periodic table, and their nitrides and oxides. For example, indicated are a semiconductor obtained by doping GaN with In, an II element or an IV element, GaP, GaInP, AlGaInP, or the like, and, further, a semiconductor obtained by doping ZnO with a Group III element. For example, an InGaN/GaN LED that emits near ultraviolet light with high emission efficiency may be used. An InGaN/GaN LED having a nanopillar structure may be used by further using a neutral beam etching technique in combination with a biotemplate technique. Furthermore, the light emitting layer 92 may be formed of a single compound semiconductor, and may have a single quantum well structure or a multi-quantum well structure. In the light emitting element CHIP, red light emitting LEDs, green light emitting LEDs, and blue light emitting LEDs can be arranged in a matrix. Further, a near infrared light emitting LED may be added. Alternatively, a quantum dot layer may be laminated as a wavelength conversion member on a monochromatic LED light emitting element.

As a constituent material for the lower electrode 88, silver, a silver alloy, aluminum, or an aluminum alloy can be applied. Further, as the configuration of the lower electrode 88, a configuration in which a silver or silver alloy layer is sandwiched between conductive metal oxide layers may be applied, as will be described later. As a part of the configuration of the lower electrode 88, a multilayer configuration including a metal layer such as a Ti layer, a Cr layer, a Pt layer, an AuGe layer, a Pd layer, an Ni layer, a TiW layer or a Mo layer, and the above-mentioned conductive metal oxide layer may be introduced. By reducing the area proportion of the lower electrode 88 in plan view, a semi-transmissive or transmissive display device can be realized. The upper electrode 87 preferably has a configuration including a layer formed of a conductive metal oxide.

As the conductive metal oxide, various composite oxides such as tin oxide, zinc oxide, gallium oxide, titanium oxide, zirconium oxide, molybdenum oxide, tungsten oxide, magnesium oxide, antimony oxide, and cerium oxide based on indium oxide can be applied, and there is a merit that the properties required of the upper electrode 87 can be easily adjusted. These properties include work function values, light transmittance, refractive index, conductivity, and etching processability. As a part of the configuration of the upper electrode, a multilayer configuration including a metal layer such as a Ti layer, a Cr layer, a Pt layer, an AuGe layer, an AuSn layer, a Pd layer, an Ni layer, a TiW layer or a Mo layer, and the above-mentioned conductive metal oxide layer may be introduced. Since the upper surface 178 of the upper electrode 87 serves as a light emitting surface, it is desirable that the area ratio of the transparent conductive metal oxide layers is large. The upper surface 178 (surface layer) of the upper electrode 87 is preferably electrically connected to the auxiliary conductor 83 having a structure in which a copper layer or a copper alloy layer is sandwiched between conductive metal oxides in a region outside the light emission surface of the light emitting element CHIP.

A material for a bank 94 may be organic resin such as acrylic resin, polyimide resin, or novolak phenol resin. Furthermore, an inorganic material such as silicon oxide, silicon oxynitride or silicon nitride may be laminated on the bank 94.

A material for a first flattening layer 96 and the second flattening layer 95 may be an acrylic resin, a polyimide resin, a benzocyclobutene resin, a polyamide resin, or the like. A low dielectric constant material (low-k material) may also be used.

In order to improve visual recognition, any of the first flattening layer 96, the second flattening layer 95, a sealing layer 109, and an adhesive layer 108 may have a light scattering function. Alternatively, a light-scattering layer may be formed above the sealing layer 109.

(Drive of Light Emitting Diode Element)

FIG. 22 is a typical circuit diagram including a thin film transistor which drives the light emitting element applied to the electronic device according to an embodiment of the present invention.

Although LED is used as the light emitting diode element in the present embodiment, an organic EL can be used instead of the LED.

In FIG. 22, a plurality of pixels PX are schematically shown, and each pixel PX is a pixel opening member sectioned by the source line 66 which is a video signal line and the gate line 69 which is a scanning line. The plurality of pixels PX are arranged in a matrix.

In plan view, the first conductive lines 55 and the gate lines 69 are superposed on each other and extend in parallel in the X direction. The second conductive lines 56 and the source lines 66 extend in the Y direction in parallel.

Figure 20:
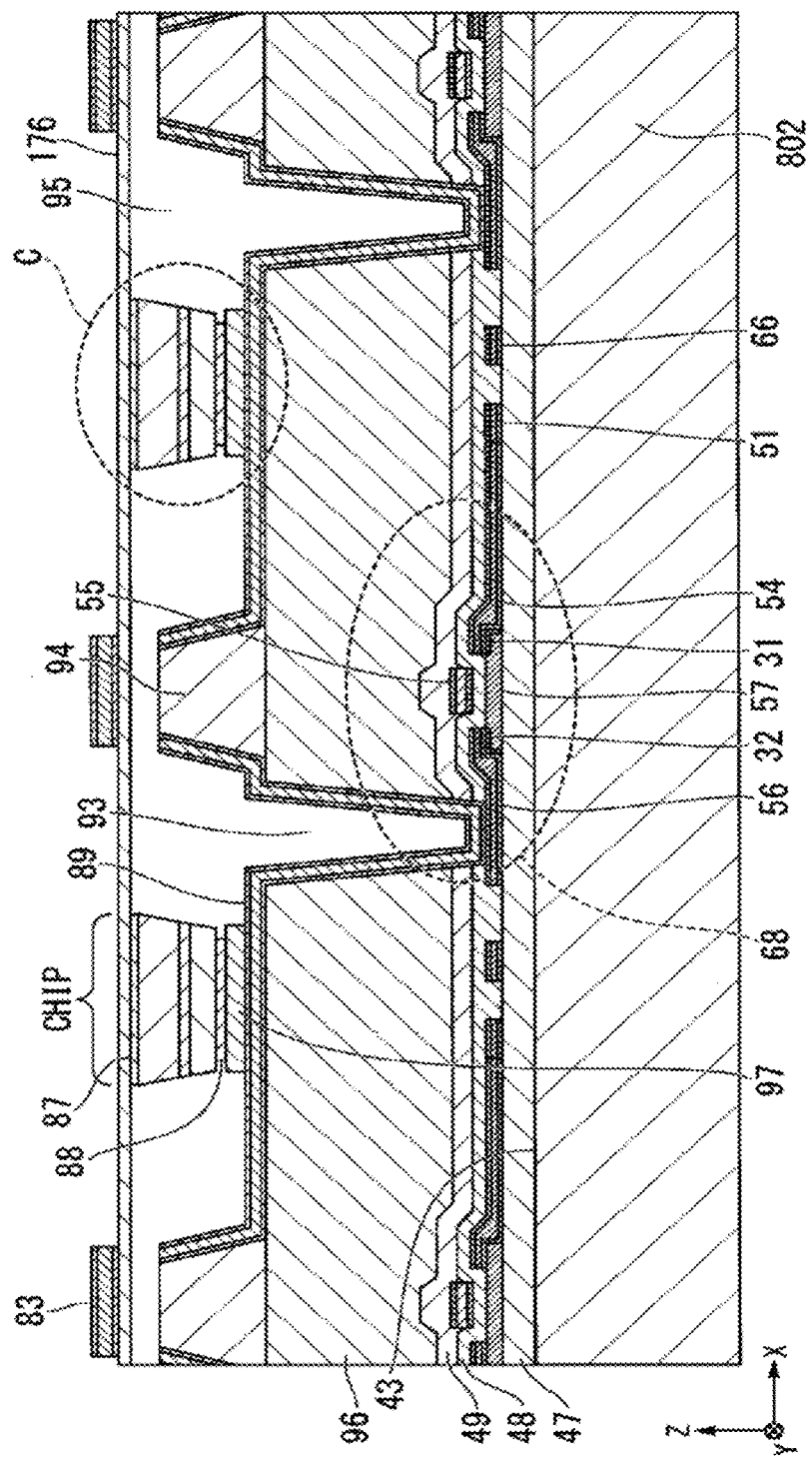
FIG. 20 is a cross-sectional view of the electronic device according to the eighth embodiment of the present invention, showing, in an enlarged manner, a part including a display function layer and a second thin film transistor provided on the second substrate constituting the electronic device.
Figure 21:
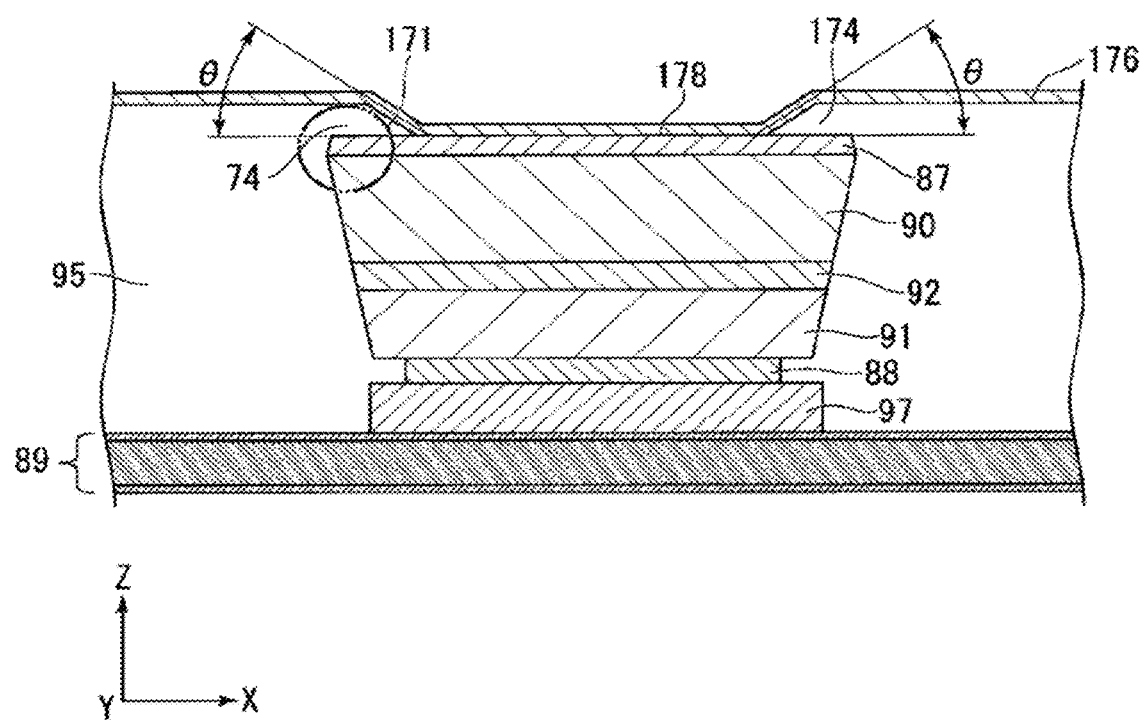
FIG. 21 is a cross-sectional view of the electronic device shown in FIG. 20, showing a light emitting element in an enlarged manner.

As shown in FIG. 20, the second thin film transistor 68 is connected to the first power source line 51 via the source electrode 54. The first power source line 51 is a power source line that supplies power to the light emitting element CHIP. The second power source line 52 is connected to the upper electrode 87 constituting the light emitting element 86 (corresponding to the light emitting element CHIP) via the transparent conductive film 176 and the auxiliary conductor 83. The second power source line 52 is maintained at a constant potential, and may be grounded to, for example, a ground (a housing or the like).

According to the present embodiment, the first conductive lines 55 extend in the Y direction and the second conductive lines 56 extend in the X direction. The first conductive lines 55 may extend in the Y direction, and, in this case, the second conductive lines 56 extend in the X direction.

As the auxiliary conductor 83, a metal line having good conductivity can be used, and it can be formed at a position where it is superposed on the first conductive lines 55 and the second conductive lines 56 in plan view while avoiding the pixel opening members (pixels PX). The auxiliary conductor 83 shown in FIG. 19 has a laminated configuration of a conductive metal oxide, a copper alloy, and a conductive metal oxide.

By using copper or a copper alloy having high thermal conductivity in a part of the configuration of the auxiliary conductor 83, heat dissipation from the light emitting diode element can be assisted and stable light emission can be obtained.

As shown in FIG. 22, the first thin film transistor 67, the second thin film transistor 68, the light emitting element 86 (corresponding to the light emitting element CHIP), a capacitive element 179 and the like are arranged in the pixels PX (pixel opening members) sectioned by the source lines 66 and the gate lines 69.

The first thin film transistor 67 is electrically linked to the source line 66 and the gate line 69. The second thin film transistor 68 is electrically linked to the first thin film transistor 67 and the first power source line 51, and receives a signal from the first thin film transistor 67 to drive the light emitting device 86, which is a vertical light emitting diode.

In each of the plurality of pixels PX, when the first thin film transistor 67 is turned on upon reception of a gate signal from the gate line 69 and a video signal from the source line 66, an ON signal is input to the gate electrode 55 of the second thin film transistor 68 that supplies power to the pixel. Current is supplied from the first power source line 51 to the light emitting element 86 via the channel layer 57 of the second thin film transistor 68, and the pixel PX (light emitting element 86) emits light according to the current.

A signal (output from the drain electrode) from the first thin film transistor 67 which is a switching transistor is output to a gate electrode 55 formed of a through hole not shown and a fourth conductive layer not shown. The second thin film transistor 68, which is a drive transistor, receives the signal from the gate electrode 55, supplies power to the light emitting element 86 from the first power source line 51, and the light emitting element 86 emits light according to the current.

The circuit diagram shown in FIG. 22 shows a typical and minimum circuit configuration for driving an LED or an organic EL, and does not limit the present invention. For example, an active element that improves display, such as a transistor that performs a reset drive for mitigating burn-in of an LED or an organic EL, may be added.

The gate line 69 is connected to a gate signal switching circuit 82 (scanning drive circuit) including a shift register, and the source line 66 is connected to a source signal switching circuit including a shift register, a video line, and an analog switch. The source signal circuit 81 and the gate signal switching circuit 82 receive a signal from the display control unit and control the light emitting element 86 which is the display function layer.

As described above, the electronic device 600 according to the present embodiment can transmit and receive a touch sensing signal and a power signal between the first substrate 801 and the third substrate 803 in a wireless manner via the antenna unit.

Further, between the second substrate 802 provided with the thin film transistor array and the third substrate 803, a signal for driving the display function layer and a power signal can be transmitted and received via the antenna unit in a wireless manner.

In addition, communication can be performed between the outside and the inside of the electronic device 600 by using the loop antenna provided on the third substrate, and power can be supplied to the electronic device 600 from an external power supply. The electronic device 600 can have such wireless signal transmission/reception techniques and wireless power supply/reception techniques.

Conventionally, a complicated mounting structure using an FPC connector has been used for the electrical connection between the first substrate and the third substrate and the electrical connection between the second substrate and the third substrate. On the other hand, the electronic device 600 according to the present embodiment has only a collective sealing structure (sealing by forming a seal portion 36) in the frame region 182, and has an extremely simple structure. Alternatively, the surrounding frame region 182 provides an effect that electrical mounting can be easily performed. A high level of waterproofness can be obtained by enabling collective sealing. A photosetting or thermosetting resin or the like can be applied to a sealant of the seal portion.
(Modification of Eighth Embodiment)

In the above embodiment, the structure in which a plurality of red light emitting LEDs, green light emitting LEDs, and blue light emitting LEDs are arranged in a matrix has been described as the light emitting element CHIP. The present invention is not limited to the structure described in the eighth embodiment. For example, a modification which will be described later can also be adopted.

A blue light emitting diode or a blue violet light emitting diode is disposed on the second substrate 802 as the light emitting element CHIP. After disposing a blue light emitting diode or a blue violet light emitting diode, a green phosphor is laminated on a green pixel and a red phosphor is laminated on a red light emitting pixel. Thus, an inorganic LED can be easily formed on the second substrate 802. When such phosphors are used, excitation by light generated from the blue violet light emitting diode provides green light emission and red light emission, respectively, from the green phosphor and the red phosphor.

An ultraviolet light emitting diode may be disposed on the second substrate 802 as the light emitting element CHIP. Further, a blue phosphor is laminated on a blue pixel, a green phosphor is laminated on a green pixel, and a red phosphor is laminated on a red pixel. When such phosphors are used, for example, green pixels, red pixels, or blue pixels can be formed by an easy method such as a printing method. It is desirable to adjust the size of the pixels or the number and area of the light emitting element CHIP arranged in one pixel, from the viewpoint of the light emitting efficiency and color balance of each of the colors.

In general, in an LED element, the light emission peak wavelength of the light emitting element may not be uniform due to variations in the surface of a sapphire substrate, in a manufacturing process using the sapphire substrate or the like. Further, the emission peak wavelength non-uniformity and light emission non-uniformity such as slight deviation of the crystal axis may occur depending on the manufacturing lot. Variations in crystal axes and crystal growth cause bias of light emitted from the light emitting layer of the light emitting element, which may cause bias of viewing angle properties of a display device. In order to make such variations uniform, it is also possible to dispose a plurality of light emitting elements of the same color in one pixel.

In inspection of the second substrate 802 in which the light emitting elements CHIP are arranged in a matrix, a near-ultraviolet light emitting LED, a violet light emitting LED, or a blue light emitting LED is used as a light source, the light emitted from this light source is applied to the second substrate 802, and excitation light emission of the LED (light emitting element CHIP) can be utilized. If necessary, a lambda converter may be incorporated in the light source in advance, and excitation light emission from each of the red light emitting LEDs, the green light emitting LEDs, and the blue light emitting LEDs as the light emitting element CHIP may be observed and used for inspection for defective chips. In the inspection using the excitation light emission, it is possible to check the appearance of the light emitting element CHIP such as to detect defective emission or chipping.

For example, a display device according to the embodiments described above can be put into practice in various ways. Examples of electronic devices to which the display device according to the above embodiments is applicable include mobile phones, portable game machines, portable information terminals, personal computers, electronic books, data carriers, IC cards, communication devices, video cameras, digital still cameras, head mounted displays, navigation systems, sound reproduction devices (car audio systems, digital audio players, and the like), copiers, facsimiles, printers, multifunction printers, vending machines, automated teller machines (ATM), personal identification devices, and optical communication devices. The embodiments described above can be used in any combination.

Preferred embodiments of the present invention have so far been described. These embodiments are, however, only examples and should not be taken as limiting the invention. Additions, omissions, substitutions, and other changes may be made without departing from the scope of the invention. Accordingly, the invention should not be construed as being limited by the foregoing description, but as being limited by the claims. The present invention, in an aspect, provides a loop antenna that can be applied to display devices and electronic devices and has a simple shape.

A first aspect of the present invention is a loop antenna including: a loop conductive line wound continuously in one direction with n turns, where n is an integer and 3 or more; a start point and an end point provided on an outermost loop or an innermost loop of the loop conductive line; a transitional region in which the loop conductive line is bent while transitioning from a loop located relatively outside to a loop located relatively inside, and portions where a plurality of loops are sequentially bent are arranged side by side from an outermost first loop to an (n−1)th loop; an insulating layer which is provided so as to overlap with the loop conductive line and the transitional region, and includes a first through hole provided at a position corresponding to an end portion of the first loop and a second through hole provided at a position corresponding to an end portion of the n-th loop; and a jumper wire provided on the insulating layer so as to cross the transitional region in plan view, the jumper wire being formed between the first through hole and the second through hole to electrically connect the first loop and the n-th loop.

In other words, the loop antenna according to the first aspect of the present invention includes a plurality of loops which are composed of a conductive line and are wound continuously in one direction with n turns, where n is an integer and 3 or more, and has a start point and an end point which are provided on an outermost loop or an innermost loop among the plurality of loops. The loop antenna has a first loop which is bent and extends along an outer shape of the loop antenna in plan view; an (n−1)th loop which is bent and extends along the first loop in plan view and is positioned inside the first loop; an n-th loop which is bent and extends along the (n−1)th loop in plan view and is positioned inside the (n−1)th loop; an outer transition portion which is joined to the adjacent loop on the outside of a first portion of the (n−1)th loop while being bent obliquely outward from the first portion; and an inner transition portion which is joined to the adjacent loop on the inside of a second portion facing the first portion while being bent obliquely inward from the second portion. The loop antenna includes a transitional region in which the mutually adjacent two loops, among the plurality of loops, are joined to each other via the inner transition portion or the outer transition portion; an insulating layer which includes through holes provided at positions corresponding to an end portion of the first loop and an end portion of the n-th loop, and which is provided so as to overlap with the plurality of loops and the transitional region in a cross-sectional view; and a jumper wire provided on the insulating layer so as to cross the inner transition portion and the outer transition portion and electrically connects the end portion of the first loop and the end portion of the n-th loop.

In the loop antenna according to the first aspect, the conductive line may have a three-layer configuration in which a copper layer or a copper alloy layer is sandwiched between conductive metal oxides.

A second aspect of the present invention is an electronic device including the loop antenna according to the first aspect.

A third aspect of the present invention is a loop antenna unit including two loop antennas which are each composed of the loop antenna according to the first aspect, the loop antennas having the same number of turns as each other, and being different from each other in winding direction, and the two loop antennas are arranged with line symmetry in which the loop antennas are not superposed on each other in plan view.

A fourth aspect of the present invention is an electronic device including the loop antenna unit according to the third aspect.

A fifth aspect of the present invention is a loop antenna unit including: two loop antennas which are each composed of a loop antenna according to the first aspect, the loop antennas having the same number of turns as each other, and being different from each other in winding direction; and a conductive pattern which partially surrounds the peripheries of the two loop antennas, the two loop antennas being arranged with line symmetry in which the loop antennas are not superposed on each other in plan view.

A sixth aspect of the present invention is an electronic device including the loop antenna unit according to the fifth aspect.

A seventh aspect of the present invention is an electronic device including: a first antenna unit composed of the loop antenna unit according to the third aspect; a second antenna unit composed of the loop antenna unit according to the fifth aspect; a third antenna unit composed of the loop antenna unit according to fifth aspect; a first substrate having a first surface and a second surface; a second substrate having a third surface and a fourth surface; a third substrate having a fifth surface and a sixth surface; and a control unit which controls a display function, a communication function and a wireless charging function, wherein the first substrate, the second substrate, and the third substrate are layered on each other in this order in plan view as viewed in an observation direction, a display function layer is provided between the second surface and the third surface, the second substrate is provided, on the third surface, with the third antenna unit and a thin film transistor array which drives the display function layer, the third substrate is provided, on the fifth surface, with the first antenna unit which performs a communication function between an outside and an inside of the electronic device and a wireless charging function from an outside of the electronic device, and the second antenna unit which performs communications, power supply and power reception to the third antenna unit, and the second antenna unit and the third antenna unit are superposed on each other, and the first antenna unit and third antenna unit are not superposed on each other in plan view as viewed in an observation direction.

An eighth aspect of the present invention is an electronic device including: a first antenna unit composed of the loop antenna unit according to the third aspect; a second antenna unit composed of the loop antenna unit according to the fifth aspect; a third antenna unit composed of the loop antenna unit according to the fifth aspect; a fourth antenna unit composed of the loop antenna unit according to the fifth aspect; a fifth antenna unit composed of the loop antenna unit according to the fifth aspect; a first substrate having a first surface and a second surface; a second substrate having a third surface and a fourth surface; a third substrate having a fifth surface and a sixth surface; and a control unit which controls a touch sensing function, a display function, a communication function and a wireless charging function, wherein the first substrate, the second substrate and the third substrate are layered on each other in this order in plan view as viewed in an observation direction, the first substrate is provided, on the second surface, with the touch sensing function including an electrostatic capacitive type touch sensing line unit and the fifth antenna unit, a display function layer is provided between the second surface and the third surface, the second substrate is provided, on the third surface, with the second antenna unit and a thin film transistor array which drives the display function layer, the third substrate is provided, on the fifth surface, with the first antenna unit which performs a communication function between an outside and an inside of the electronic device and a wireless charging function from an outside of the electronic device, the second antenna unit which performs communications, power supply and power reception to the third antenna unit, and the fourth antenna unit which performs communications, power supply and power reception to the fifth antenna unit, and the second antenna unit and the third antenna unit are superposed on each other, the fourth antenna unit and the fifth antenna unit are superposed on each other, and the first antenna unit is superposed neither on the second antenna unit nor on the fourth antenna unit in plan view as viewed in an observation direction.

The aspects of the present invention can reduce noise radiated from the loop antenna and reduce the influence of external noise on the loop antenna.

REFERENCE SIGNS LIST 1, 1', 2, 3, 4, 5, 5', 537, 538, 811, 812, 813, 814, 815, 821, 822, 823, 824, 825: Loop (loop conductive line)
1A, 5A: First divided loop
1B, 5B: Second divided loop
1E, 5E, 5T, 20BT: End portion
1T, 2E, 2T, 3E, 3T, 4E, 4T, 5E, 5T: First portion
2, 3, 15A, 15B, 15C, 15D, 16A, 16B, 16C, 16D: Transition portion 6, 7: Jumper wire
8, 38: Insulating layer
8A: First through hole
8B: Second through hole
93: Through hole
11, 23: First terminal
12, 24: Second terminal
13, 13', 22: Start point
14, 21: End point
15: Transitional region
16: Transitional region
20: Conductive pattern
20A: Back portion
20B: Side portion
20D: Opening
26: Source signal switching circuit
27: Gate signal switching circuit
28: Display control unit
33: Power supply unit
34: Video signal transmitting unit
35: Second power receiving unit (power receiving unit)
36: Video signal receiving unit
37: Fourth insulating layer
38: Fifth insulating layer
39: Sixth insulating layer
41: First surface
42: Second surface
43: Third surface
44: Fourth surface
45: Fifth surface
46: Sixth surface
51: First power source line
52: Second power source line (power source line)
54, 164: Source electrode
55: First conductive line (gate electrode)
56: Second conductive lines
57, 168: Channel layer
58: Second source control unit
59: First power source control unit
66: Source line
67: First thin film transistor
68: Second thin film transistor
71, 73: Touch signal receiving unit
72: Touch power receiving unit (first power receiving unit)
74: Touch power supplying unit
76: Power source control unit
77: Touch driving control unit
78: Touch driving switching circuit
79: Touch detection switching circuit
80: Touch signal transmission/reception control unit
81: Source signal circuit
82: Gate signal switching circuit
83: Auxiliary conductor
85: Detection and AD conversion unit
86, CHIP: Light emitting element
87: Upper electrode
88: Lower electrode
89: Reflective electrode
90: N-type semiconductor layer
91: P-type semiconductor layer
92: Light emitting layer
94: Bank
95: Second flattening layer
96: First flattening layer
97: Joining layer
100, 200, 300, 800: Loop antenna unit
110, 110', 128, 130A, 130B, 410, 531, 532, 533A, 533B, 534A, 534B, 535A, 535B, 536A, 536B, 571A, 571B, 572A, 572B, 573A, 573B, 574A, 574B, 810, 820, 900: Loop antenna
108: Adhesive layer
109: Sealing layer
156: Secondary battery
134: Conductive shield layer
134A: First conductive metal oxide layer
134B: Copper alloy layer
134C: Second conductive metal oxide layer
134D: Light absorbing layer
140: Display unit
141: Display function layer
142: Display function drive unit
150, 250: System control unit
151: Antenna section
152, 414: Charging control unit
153: Switching unit
154: NFC communication unit
157: Power supply-side antenna
158: Adapter
159: Cradle
160: Touch sensing unit
161: Touch function drive unit
162: Touch sensing line unit
163: Third thin film transistor
165, 69: Gate electrode
166: Drain electrode
171: Corner portion
173: Magnetic member layer
174: Overlapped portion
176: Transparent conductive film
177: Signal line
178: Upper surface
179: Capacitive element
182: Frame region
200, 300, 800: Antenna unit
400, 500, 600: Electronic device
411: Antenna power source unit
412: Control unit
413: Memory
414: Charging control unit
415: Secondary battery
510: First antenna unit
520: Second antenna unit
530: Third antenna unit
533: Power supplying antenna unit
534: Video signal transmitting antenna unit
535: Power receiving antenna unit
536: Video signal receiving antenna unit
540: Fourth antenna unit
550: Fifth antenna unit
571, 573: Touch signal receiving antenna unit
572, 574: Touch power receiving antenna unit
700, SB: Substrate
701, 801: First substrate
702, 802: Second substrate
703, 803: Third substrate
901: Outermost circumferential loop
902: Innermost circumferential loop
HD: Internal region
LD: External region
P: Observer
PX: Pixel opening member (pixel)
TFT: Active element Obviously, numerous modifications and variations of the present invention are possible in light of the above teachings. It is therefore to be understood that within the scope of the appended claims, the invention may be practiced otherwise than as specifically described herein.

What is claimed is:

1. An electronic device, comprising:
a plurality of antenna units including a first antenna unit, a second antenna unit, and a third antenna unit;
a plurality of substrates including a first substrate, a second substrate, and a third substrate which are positioned on each other in an order thereof in a plan view as viewed in an observation direction;
a display function layer formed between the first substrate and the second substrate; and
a controller comprising circuitry configured to control a display function, a communication function and a wireless charging function,
wherein each of the first, second and third antenna units includes a loop antenna unit comprising two loop antennas having a same number of turns and different winding directions such that the two loop antennas are positioned in line symmetry and not superposed on each other in a plan view, each of the two loop antennas includes a loop conductive line, an insulating layer and a jumper wire such that the loop conductive line is wound continuously in one direction with n turns, where n is an integer of 3 or more, forming a plurality of loops from a start point on one of an outermost loop and an innermost loop to an end point on the other one of the outermost loop and the innermost loop, and bent in a transitional region in a direction from an outer loop toward an inner loop, that the loops have bent portions positioned side by side from an outermost first loop to an (n−1)th loop in the transitional region, that the insulating layer overlaps with the loop conductive line and the transitional region and has a first through hole at a position corresponding to an end portion of the first loop and a second through hole at a position corresponding to an end portion of the n-th loop, and that the jumper wire is positioned on the insulating layer to cross the transitional region in a plan view and formed between the first through hole and the second through hole to electrically connect the first loop and the n-th loop, each of the second and third antenna units further includes a conductive pattern partially surrounding peripheries of respective two loop antennas, the second substrate has the third antenna unit and a thin film transistor array configured to drive the display function layer, the third substrate has the first antenna unit configured to perform a communication function between an outside and an inside of the electronic device and a wireless charging function from an outside of the electronic device, and the second antenna unit configured to perform communication, power supply and power reception to the third antenna unit, and the second antenna unit and the third antenna unit are superposed on each other, and the first antenna unit and the third antenna unit are not superposed on each other in a plan view as viewed in the observation direction.

2. The electronic device according to claim 1, wherein the loop conductive line has a three-layer configuration comprising a plurality of conductive metal oxides and one of a copper layer and a copper alloy layer sandwiched between the conductive metal oxides.

3. The electronic device according to claim 1, wherein the loop antenna unit includes a substrate and the two loop antennas formed in the substrate.

4. The electronic device according to claim 3, wherein the loop conductive line has a three-layer configuration comprising a plurality of conductive metal oxides and one of a copper layer and a copper alloy layer sandwiched between the conductive metal oxides.

5. An electronic device, comprising:
a plurality of antenna units including a first antenna unit, a second antenna unit, a third antenna unit, a fourth antenna unit, and a fifth antenna unit;
a plurality of substrates including a first substrate, a second substrate, and a third substrate which are positioned on each other in an order thereof in a plan view as viewed in an observation direction;
a display function layer formed between the first substrate and the second substrate; and
a controller comprising circuitry configured to control a touch sensing function, a display function, a communication function between an outside and an inside of the electronic device, and a wireless charging function from an outside of the electronic device,
wherein each of the first, second, third, fourth and fifth antenna units includes a loop antenna unit comprising two loop antennas having a same number of turns and different winding directions such that the two loop antennas are positioned in line symmetry and not superposed on each other in a plan view, each of the two loop antennas includes a loop conductive line, an insulating layer and a jumper wire such that the loop conductive line is wound continuously in one direction with n turns, where n is an integer of 3 or more, forming a plurality of loops from a start point on one of an outermost loop and an innermost loop to an end point on the other one of the outermost loop and the innermost loop, and bent in a transitional region in a direction from an outer loop toward an inner loop, that the loops have bent portions positioned side by side from an outermost first loop to an (n−1)th loop in the transitional region, that the insulating layer overlaps with the loop conductive line and the transitional region and has a first through hole at a position corresponding to an end portion of the first loop and a second through hole at a position corresponding to an end portion of the n-th loop, and that the jumper wire is positioned on the insulating layer to cross the transitional region in a plan view and formed between the first through hole and the second through hole to electrically connect the first loop and the n-th loop, each of the second, third, fourth and fifth antenna units further includes a conductive pattern partially surrounding peripheries of respective two loop antennas, the first substrate has the touch sensing function including an electrostatic capacitive type touch sensing line unit and the fifth antenna unit, the second substrate has the third antenna unit and a thin film transistor array configured to drive the display function layer, the third substrate has the first antenna unit configured to perform the communication function and the wireless charging function, the second antenna unit configured to perform communications, power supply and power reception to the third antenna unit, and the fourth antenna unit configured to perform communications, power supply and power reception to the fifth antenna unit, and the second antenna unit and the third antenna unit are superposed on each other, the fourth antenna unit and the fifth antenna unit are superposed on each other, and the first antenna unit is not superposed on either of the second antenna unit and the fourth antenna unit in a plan view as viewed in the observation direction.

6. The electronic device according to claim 5, wherein the loop conductive line has a three-layer configuration comprising a plurality of conductive metal oxides and one of a copper layer and a copper alloy layer sandwiched between the conductive metal oxides.

7. The electronic device according to claim 5, wherein the loop antenna unit includes a substrate and the two loop antennas formed in the substrate.

8. The electronic device according to claim 7, wherein the loop conductive line has a three-layer configuration comprising a plurality of conductive metal oxides and one of a copper layer and a copper alloy layer sandwiched between the conductive metal oxides.

* * * * *